United States Patent
Chen et al.

(10) Patent No.: US 11,966,832 B2
(45) Date of Patent: Apr. 23, 2024

(54) STRUCTURED GRAPH CONVOLUTIONAL NETWORKS WITH STOCHASTIC MASKS FOR NETWORK EMBEDDINGS

(71) Applicant: Visa International Service Association, San Francisco, CA (US)

(72) Inventors: Huiyuan Chen, San Jose, CA (US); Yu-San Lin, Mountain View, CA (US); Lan Wang, Urbana, IL (US); Michael Yeh, Newark, CA (US); Fei Wang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/264,052

(22) PCT Filed: Jul. 2, 2021

(86) PCT No.: PCT/US2021/040312
§ 371 (c)(1),
(2) Date: Aug. 2, 2023

(87) PCT Pub. No.: WO2022/169480
PCT Pub. Date: Aug. 11, 2022

(65) Prior Publication Data
US 2024/0046075 A1    Feb. 8, 2024

Related U.S. Application Data

(60) Provisional application No. 63/146,089, filed on Feb. 5, 2021.

(51) Int. Cl.
*G06N 3/0464* (2023.01)
*G06N 3/047* (2023.01)
*G06Q 30/0282* (2023.01)
*G06Q 30/0601* (2023.01)

(52) U.S. Cl.
CPC .......... *G06N 3/0464* (2023.01); *G06N 3/047* (2023.01); *G06Q 30/0282* (2013.01); *G06Q 30/0631* (2013.01)

(58) Field of Classification Search
CPC .. G06N 3/0464; G06N 3/047; G06Q 30/0282; G06Q 30/0631
See application file for complete search history.

(56) References Cited

U.S. PATENT DOCUMENTS

| | | | |
|---|---|---|---|
| 11,228,505 B1 * | 1/2022 | Wang | G06N 5/01 |
| 2020/0250734 A1 | 8/2020 | Pande et al. | |
| 2023/0153579 A1 * | 5/2023 | Sun | G06N 3/0464 |
| | | | 706/25 |

FOREIGN PATENT DOCUMENTS

| | | |
|---|---|---|
| CN | 111738414 A | 10/2020 |
| CN | 111931076 A | 11/2020 |
| CN | 112085171 A | 12/2020 |

OTHER PUBLICATIONS

Chen et al., "Stochastic Training of Graph Convolutional Networks with Variance Reduction", Mar. 1, 2018, arXiv: 1710.10568v3, pp. 1-30. (Year: 2018).*

(Continued)

*Primary Examiner* — Brent Johnston Hoover
(74) *Attorney, Agent, or Firm* — Kilpatrick Townsend & Stockton LLP

(57) ABSTRACT

A method includes receiving a first data set comprising embeddings of first and second types, generating a fixed adjacency matrix from the first dataset, and applying a first stochastic binary mask to the fixed adjacency matrix to obtain a first subgraph of the fixed adjacency matrix. The method also includes processing the first subgraph through a first layer of a graph convolutional network (GCN) to obtain a first embedding matrix, and applying a second stochastic binary mask to the fixed adjacency matrix to (Continued)

obtain a second subgraph of the fixed adjacency matrix. The method includes processing the first embedding matrix and the second subgraph through a second layer of the GCN to obtain a second embedding matrix, and then determining a plurality of gradients of a loss function, and modifying the first stochastic binary mask and the second stochastic binary mask using at least one of the plurality of gradients.

20 Claims, 12 Drawing Sheets

(56) References Cited

OTHER PUBLICATIONS

Yang et al., "Masked Graph Convolutional Network", Aug. 10, 2019, IJCAI'19: Proceedings of the 28th International Joint Conference on Artificial Intelligence, pp. 4070-4077. (Year: 2019).*

PCT/US2021/040312, "International Search Report and Written Opinion", dated Oct. 27, 2021, 9 pages.
Wu et al., "A Comprehensive Survey on Graph Neural Networks", Available online at:https://arxiv.org/pdf/1901.00596.pdf, Dec. 4, 2019, 22 pages.
Ying, Rex, et al. "Graph convolutional neural networks for web-scale recommender systems", *Proceedings of the 24th ACM SIGKDD International Conference on Knowledge Discovery & Data Mining.* Jun. 6, 2018, 10 pages.
Wang, Xiang, et al. "Neural graph collaborative filtering", *Proceedings of the 42nd international ACM SIGIR conference on Research and development in Information Retrieval.* Jul. 3, 2020, 10 pages.
He, Xiangnan, et al. "Lightgcn: Simplifying and powering graph convolution network for recommendation", *Proceedings of the 43rd International ACM SIGIR Conference on Research and Development in Information Retrieval*, Jul. 7, 2020, 10 pages.
Rong, Yu, et al. "Dropedge: Towards deep graph convolutional networks on node classification", *ICLR*, Mar. 12, 2020, 18 pages.
Srivastava, Nitish, et al. "Dropout: a simple way to prevent neural networks from overfitting", *The journal of machine learning research* 15.1 (2014): 1929-1958, 30 pages.

* cited by examiner

STRUCTURED GRAPH CONVOLUTIONAL NETWORKS WITH STOCHASTIC MASKS FOR NETWORK EMBEDDINGS

CROSS-REFERENCES TO RELATED APPLICATIONS

This application is a National Stage of International Application No. PCT/US2021/040312, filed Jul. 2, 2021, which claims priority to and the benefit of U.S. Provisional Patent Application No. 63/146,089 filed on Feb. 5, 2021, which are herein incorporated by reference in their entirety.

BACKGROUND

A recommendation system can be used to provide a suggestion based on a rating for an item to a user. Recommendation systems are used in a wide variety of fields. For example, a social media network may use a recommendation system to provide a user with list of other users of the platform based on a rating which incorporates a number of features such as location, education history, place of employment etc. Another example may be an online marketplace, which may use a recommendation system to suggest a good and/or service to a user based upon data of prior purchases, search history, etc. A prominent technique to implement such a recommendation system is collaborative filtering, which takes a user's historical data and assumes that users who share similar preferences in prior data tend to make similar decisions in the future. However, many recommendation systems are unable to learn high-order user-item feature interactions.

Graph convolutional networks are powerful representation learning frameworks for collaborative filtering. The key component is to explore message passage, or certain neighborhood aggregation mechanisms, to extract high-level representations of users and items. However, many real-world user-item graphs are often incomplete and noisy, which may lead to suboptimal performance of the graph convolutional network if not regularized properly.

Embodiments of the disclosure address these problems and other problems individually and collectively.

SUMMARY

One embodiment is related to a method comprising: receiving a first dataset comprising a plurality of embeddings of a first type and of a second type, the embeddings of the first type associated with a first node type and the embeddings of the second type associated with a second node type; generating a fixed adjacency matrix from the first dataset; applying a first stochastic binary mask to the fixed adjacency matrix to obtain a first subgraph of the fixed adjacency matrix; processing the first subgraph of the adjacency matrix through a first layer of a graph convolutional network to obtain a first embedding matrix; applying a second stochastic binary mask to the fixed adjacency matrix to obtain a second subgraph of the fixed adjacency matrix; processing the first embedding matrix and the second subgraph of the fixed adjacency matrix through a second layer of the graph convolutional network to obtain a second embedding matrix; determining a plurality of gradients of a loss function; modifying the first stochastic binary mask and the second stochastic binary mask using at least one of the plurality of gradients; generating a second fixed adjacency matrix from a second dataset; applying the modified first stochastic binary mask to the second fixed adjacency matrix to obtain a third subgraph of the second fixed adjacency matrix; processing the third subgraph of the second adjacency matrix through the first layer of the graph convolutional network to obtain a third embedding matrix associated with the second dataset; applying the modified second stochastic binary mask to the second fixed adjacency matrix to obtain a fourth subgraph of the second fixed adjacency matrix; processing the third embedding matrix associated with the second dataset and the fourth subgraph of the second fixed adjacency matrix through the second layer of the graph convolutional network to obtain a fourth embedding matrix associated with the second dataset; and generating a recommendation score between an embedding of the first type and an embedding of the second type from the second dataset, using at least the third embedding matrix and the fourth embedding matrix associated with the second dataset.

Another embodiment is related to a server computer comprising: a processor; and a non-transitory computer readable medium comprising code executable by the processor for executing: receive a first dataset comprising a plurality of embeddings of a first type and of a second type, the embeddings of the first type associated with a first node type and the embeddings of the second type associated with a second node type; generate a fixed adjacency matrix from the first dataset; apply a first stochastic binary mask to the fixed adjacency matrix to obtain a first subgraph of the fixed adjacency matrix; process the first subgraph of the adjacency matrix through a first layer of a graph convolutional network to obtain a first embedding matrix; apply a second stochastic binary mask to the fixed adjacency matrix to obtain a second subgraph of the fixed adjacency matrix; process the first embedding matrix and the second subgraph of the fixed adjacency matrix through a second layer of the graph convolutional network to obtain a second embedding matrix; determine a plurality of gradients of a loss function; modify the first stochastic binary mask and the second stochastic binary mask using at least one of the plurality of gradients; generate a second fixed adjacency matrix from a second dataset; apply the modified first stochastic binary mask to the second fixed adjacency matrix to obtain a third subgraph of the second fixed adjacency matrix; process the third subgraph of the second adjacency matrix through the first layer of the graph convolutional network to obtain a third embedding matrix associated with the second dataset; apply the modified second stochastic binary mask to the second fixed adjacency matrix to obtain a fourth subgraph of the second fixed adjacency matrix; process the third embedding matrix associated with the second dataset and the fourth subgraph of the second fixed adjacency matrix through the second layer of the graph convolutional network to obtain a fourth embedding matrix associated with the second dataset; and generate a recommendation score between an embedding of the first type and an embedding of the second type from the second dataset, using at least the third embedding matrix and the fourth embedding matrix associated with the second dataset.

A better understanding of the nature and advantages of embodiments of the present invention may be gained with reference to the following detailed description and accompanying drawings.

DETAILED DESCRIPTION

Figure 1:
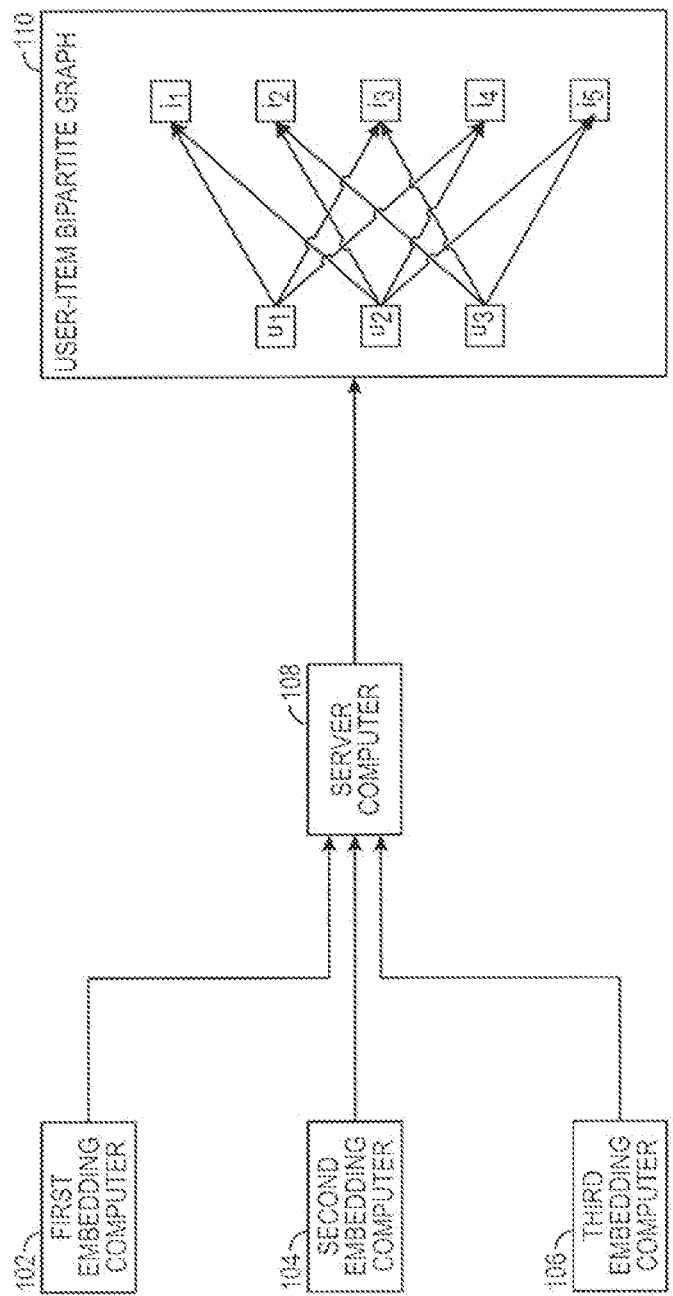
FIG. 1 shows a block diagram for a system generating user-item relationship data.

Prior to discussing embodiments of the disclosure, some terms can be described in further detail.

A "stochastic binary mask" may be a binary data item used to mask matrices. In some embodiments, the stochastic binary mask may be a matrix with elements comprising 0 or 1. A stochastic binary mask may be learned or generated randomly. In some embodiments, stochastic binary masks can be applied to other matrices in order to set values of the other matrix to 0, effectively masking that value.

An "embedding" may be a low-dimensional representation of data. An embedding process may be used to translate a high-dimensional vector into a low-dimensional representation.

A "node" may be a point at which lines or pathways interact or branch. Nodes may have different types. For example, a node may be of a first type, such as a "user node." A node may be of a second type which may be a "item node."

A "dataset" may be a collection of data. For example, a dataset may be data which comprises connections between two types of nodes. The nodes may be users and items, in which case the dataset comprises interactions between users and items.

An "adjacency matrix" may be a matrix that comprises connections between nodes of a dataset. For example, the adjacency matrix may indicate which nodes of a dataset have a connection. In some embodiments, the adjacency matrix comprises the connections between a set of users and a set of items, and the elements of the adjacency matrix may be the connections.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. INTRODUCTION

Personalized recommender systems have been widely deployed in many online services to meet users' interests and address the issue of information overload [Paul Covington, Jay Adams, and Emre Sargin, 2016, In *RecSys*, 191-198; JizheWang et al., 2018, In KDD, 839-848; Rex Ying et al., 2018, In *KDD*, 974-983]. One of the most prominent techniques is collaborative filtering, which considers the users' historical interactions and assumes that users who share similar preferences in the past tend to make similar decisions in the future. In particular, Factorization Machines have achieved great success by using the inner product of a user embedding and an item embedding as a preference score [Yehuda Koren, Robert Bell, and Chris Volinsky, 2009, *Computer* (2009), 30-37; Steffen Rendle, 2012, *ACM Transactions on Intelligent Systems and Technology* (2012), 1-22]. Despite their effectiveness, their recommendation performances are unsatisfactory due to the lack of strategies to learn high-order user-item feature interactions [Huifeng Guo et al., 2017, In *IJCAI*; Xiangnan He et al., 2017, In *WWW*, 173-182; Jianxun Lian et al., 2018, In *KDD*, 1754-1763; Dawen Liang et al., 2018, In WWW, 689-698; Guorui Zhou et al., 2018, In KDD, 1059-1068]. Deep learning techniques thus have started to dominate the landscape of recommender systems [Shuai Zhang et al., 2019, *ACM Computing Surveys (CSUR)* (2019), 1-38].

Recently, Graph Convolutional Networks (GCNs) have become increasingly powerful in representation learning of graph-structured data [Will Hamilton, Zhitao Ying, and Jure Leskovec, 2017, In *NeurIPS*, 1024-1034; Thomas N. Kipf and Max Welling, 2017, In *ICLR*; Felix Wu et al., 2019, In *ICML*, 6861-6871]. graph convolutional networks use a message passing mechanism over the input graph, which can be summarized into three steps: 1) Initialize node representations with their initial attributes or structural features like node degrees; 2) Update the representation of each node by recursively aggregating and transforming over the representations of its neighboring nodes; and 3) Readout the final representation of a single node or the entire graph as required by the downstream tasks. By regarding user-item interactions as a bipartite graph, some have attempted to adopt graph convolutional networks for recommendation due to their theoretical elegance and performance [Wenqi Fan et al., 2019, In *WWW*, 417-426; Xiangnan He et al., 2020, In *SIGIR*, 639-648; Federico Monti, Michael Bronstein, and Xavier Bresson, 2017, In *NeurIPS*, 3697-3707; Xiang Wang et al., 2019, In *SIGIR*, 165-174; Rex Ying et al., 2018, In *KDD*, 974-983]. For example, PinSage [Rex Ying et al., 2018, In *KDD*, 974-983] combines efficient random walks and graph convolutions to generate item embeddings. NGCF [Xiang Wang et al., 2019, In *SIGIR*, 165-174] proposes an embedding propagation layer to investigate the high-order connectivities in the bipartite graphs. LightGCN [Xiangnan He et al., 2020, In *SIGIR*, 639-648] recently simplifies the design of graph convolutional networks to make it more concise for recommendation.

Although encouraging performances have been achieved, graph convolutional networks are known to be vulnerable to the quality of the input graphs due to its recursive message passing schema [Hanjun Dai et al., 2018, In *ICML*, 1115-1124; Dingyuan Zhu et al., 2019, In *KDD*, 1399-1407]. Unfortunately, real-world user-item graphs are often noisy. This is particularly true for implicit behaviors, as they are not necessarily aligned with user preferences [Yuta Saito, 2020, In *WSDM*, 501-509]. If graph convolutional networks are not regularized properly, aggregating misleading neighborhood information will likely to lead to sub-optimal performance. The following examples, described with respect to FIG. 1 and FIG. 2, can be used to further explain the concerns mentioned above.

FIG. 1 shows a block diagram of a system 100 for generating user-item relationship data. FIG. 1 includes a first embedding computer 102, a second embedding computer 104, a third embedding computer 106, and a server computer 108. The first embedding computer 102, the second embedding computer 104, the third embedding computer 106, and the server computer 108 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like. It is understood that embodiments of the invention can include more or less computers than are shown in FIG. 1.

In step S100, the first embedding computer 102 may provide a first dataset that contains data associated with a plurality of users. The data may comprise, for each user in the dataset, a list of items related to the user. The list may comprise data associated with the item. For example, if the item is a movie, then the data of the item may comprise the title of the movie, the genre of the movie, the length of the movie, the director of the movie, etc. The first embedding computer 102 can provide a list of movies, and data associated with the movies in the list of movies, that are watched by the plurality of users to the server computer 108. The second embedding computer 104 and the third embedding computer 106 may provide similar data to the server computer 108. For example, the second embedding computer 104 may provide a second dataset associated with the same or different plurality of users. Similarly, the third embedding computer 106 may provide similar data to the server computer 108. For example, the third embedding computer 106 may provide a third dataset associated with the same or different plurality of users. Although three embedding computers are illustrated in FIG. 1, there may be more or less embedding computers in other embodiments.

After receiving datasets from one or more of the embedding computers, the server computer 108 may analyze the data that was provided. For example, the server computer 108 may generate a user-item bipartite graph 110 using at least one of the datasets received. The user-item bipartite graph 110 may be a graphical representation of a dataset. The user-item bipartite graph 110 may show connections between representations of users $u_i$ and items $i_j$. A line between nodes (e.g., a node may be a user or an item) may represent that the two nodes have a connection (e.g., the user $u_1$ has watched movie $i_1$). In the example of a list of movies watched by a user, users $u_1$, $u_2$, $u_3$ may have watched some of the movies $i_1$, $i_2$, $i_3$, $i_4$, $i_5$. A line between user $u_1$ and movie $i_1$ may represent that the user $u_1$ has watched at least some of movie $i_1$. However, the connections between a user and different items may have different strengths (e.g., a user may only watch part of a movie or the whole movie). A dataset may or may not provide information relating to the strength of a connection between users and items.

Figure 2:
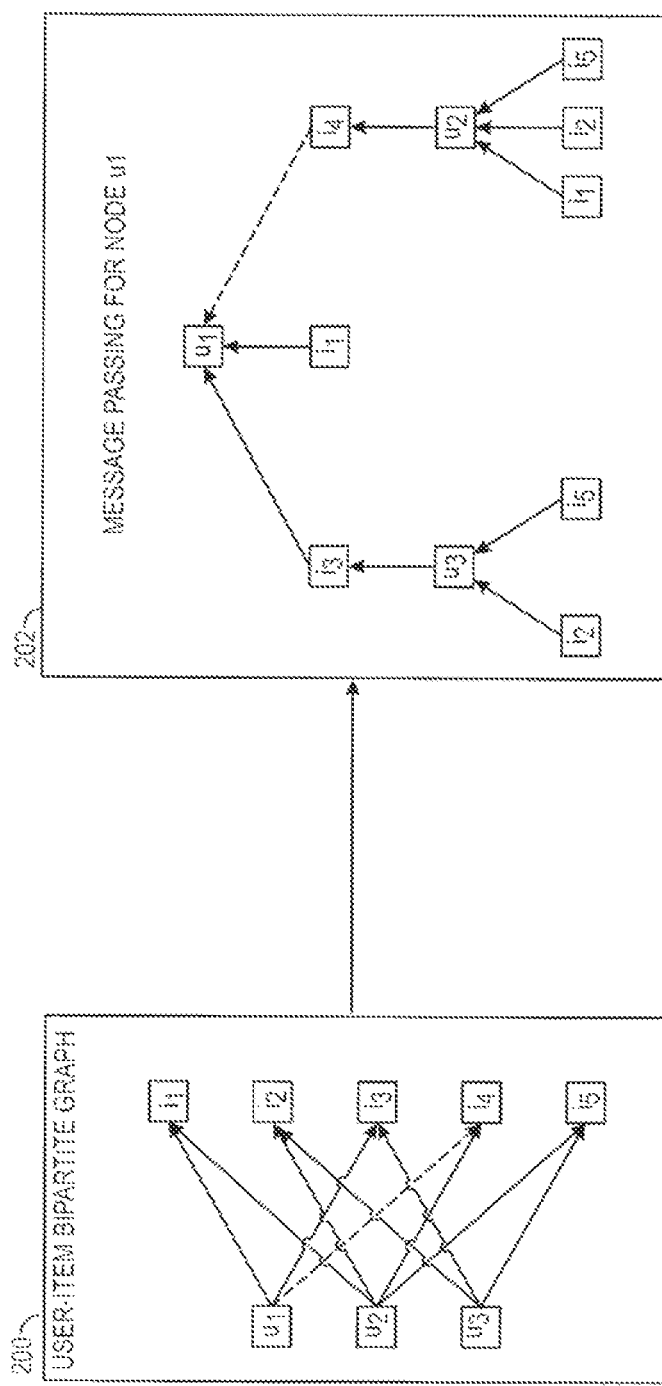
FIG. 2 shows noisy user-item data generating misleading information for a target user.

FIG. 2 shows noisy user-item data generating misleading information for a target user. The user-item bipartite graph 200 may contain a noisy edge. For example, a node such as user $u_1$ may have a noisy connection with item $i_4$. The corresponding message passing node for $u_1$ 202 may comprise the noisy connection. A noisy connection may occur when the relation between the user $u_1$ and the item $i_4$ is weak, or otherwise unintended.

The key idea behind graph convolutional networks is to fully discover the high-order relations in the bipartite graph. As such, the representation of node $i_2$ can be aggregated to update the representation of target node $u_1$ through the path $u_1 \leftarrow i_3 \leftarrow u_3 \leftarrow i_2$, even though there is no explicit connection between $u_1$ and $i_2$. However, noisy connections, such as the one between $u_1$ and $i_4$, may lead to misleading information about a user. The first-hop neighbor $i_4$ or the second-hop neighbor $u_2$ can be also passed to the target node $u_1$ via the noisy connection $u_1$–$i_4$, which degrades the performance of analysis. As the graph convolutional networks go deeper, these misleading messages would continue to propagate and contaminate the entire graph. For example, noisy connections may cause users to be recommended items from another user who is, in reality, largely unrelated.

To this end, it is preferable to remove the irrelevant neighbors during message passing. Otherwise, including less useful messages will complicate the model training, increase the risk of over-fitting, and even impair model effectiveness. The key challenge is then to decide the criteria to omit irrelevant neighbors during the training stage. Fortunately, real-world graphs are often sparse and low-rank [Santo Fortunato, 2010, *Physics reports* 486, 3-5 (2010), 75-174]. Sparsity implies that only the most significant neighbors should be locally connected to the target nodes during the message passing. Low-rank indicates that the entire graph is globally structured and only a few factors contribute to a user's preferences. These two intrinsic graph properties are widely used in the linear matrix completion models [Yehuda Koren, Robert Bell, and Chris Volinsky, 2009, *Computer* (2009), 30-37; Xia Ning and George Karypis, 2011, In *ICDM*, 497-506], e.g., $l_p$ norm regularization or matrix rank minimization, but far less studied in the graph neural models. One approach is to first create a clean k-nearest neighbor graph based on a certain similarity function. This is a common strategy used in shadow graph models such as LLE [Sam T Roweis and Lawrence K Saul, 2000, *science* 290, 5500 (2000), 2323-2326] and Isomap [Joshua B Tenenbaum, Vin De Silva, and John C Langford, 2000, *science* 290, 5500 (2000), 2319-2323], and has been recently revisited in deep graph models [Zheng et al., 2020, In *ICML*, 11458-11468]. The expressive power of k-nearest neighbor, however, is limited by the choice of k as well as the similarity function in the embedding space.

To address above problems, a Structured Graph Convolutional Network (SGCN) may be used to enhance the performance of graph convolutional networks by exploiting graph structural properties of sparsity and low rank. To achieve sparsity in the graph, a stochastic binary mask is attached to each layer of a graph convolutional network to prune noisy and insignificant edges under the framework of graph convolutional networks, such as the noisy connection $u_1$–$i_4$. Intuitively, the stochastic binary masks (i.e., 1 is sampled and 0 is dropped) can be regarded as graph generators so as to support a high-quality sparse graph for each layer of graph convolutional networks. The motivation to do so is two-fold: 1) Noisy edges with parameterized masks can be learned to be dropped in a data-driven fashion, a resulting sparse message passing strategy is thus less complicated and has better generalization ability; 2) Over-fitting and over-smoothing are two of the main bottlenecks of developing deeper graph convolutional networks [Yu Rong et al., 2019, In *ICLR*]. These issues can be mitigated by sampling subgraphs with the stochastic binary mask mechanism. Nevertheless, directly training the stochastic binary masks is intractable due to the combinatorial nature of discrete samples. To make samples differentiable, further reformulation is required in the optimization problem from a discrete space to a continuous one via probabilistic reparameterization [Eric Jang, Shixiang Gu, and Ben Poole, 2017, In *ICLR*; Mingzhang Yin and Mingyuan Zhou, 2019, In *ICLR*]. An unbiased gradient estimator is further proposed to better backpropagate the gradients of binary variables. Inspired by the adversarial machine learning [Negin Entezari et al., 2020, In *WSDM*, 169-177; Wei Jin, et al., 2020, In *KDD*, 66-74], low-rank constraints are also imposed to the sparse adjacency matrices for each layer of a graph convolutional networks. This regularization forces the graphs to be globally structured, which have been shown to be very successful in defending adversarial attacks [Negin Entezari et al., 2020, In *WSDM*, 169-177; Wei Jin, et al., 2020, In *KDD*, 66-74], and in defending against noise in recommendation.

Extensive experiments are conducted to evaluate the effectiveness and robustness of the proposed structured graph convolutional network method. Embodiments of the invention have several benefits over conventional systems. The structured graph convolutional network according to embodiments of the invention, uses an approach that explicitly prunes the irrelevant neighbors in the message passing stage of graph convolutional networks, which largely reduces the negative impacts of noise in recommender systems. Stochastic binary masks are developed with the goal of selecting the sparse and high-quality sub-graphs for each layer of a graph convolutional network. Low-rank constraints are also imposed to enhance the robustness and generalization of the graph convolutional network. Additionally, an unbiased gradient estimator is created for stochastic binary optimization by casting it to an equivalent one in the continuous space. As such, it is possible to jointly learn the parameters of stochastic binary masks as well as parameters of the graph convolutional network. Extensive experiments are conducted on four public datasets. The results demonstrate the benefits of structured graph convolutional network on the effectiveness of pruning noisy edges and the usage of low-rank constraints, resulting in 4.92%-26.23% performance gains over traditional methods.

II. RELATED WORK

In this section, related work on recommender systems and graph convolutional networks are reviewed. Differences between the existing efforts and the structured graph convolutional network are described.

A. Collaborative Filtering

Recommender systems often employ Collaborative Filtering (CF) to learn sophisticated feature interactions between users and items based on users' historical profiles [Yifan Hu, Yehuda Koren, and Chris Volinsky, 2008, In *ICDM*, 263-272; Steffen Rendle, In *UAI*, 452-461]. Matrix factorization is an early approach to learn the latent embeddings of users and items from user-item rating matrices and uses an inner product to predict the users' preference [Yehuda Koren, Robert Bell, and Chris Volinsky, 2009, *Computer* (2009), 30-37; Steffen Rendle, 2012, *ACM Transactions on Intelligent Systems and Technology* (2012), 1-22]. Motivated by the expressive power of deep neural networks, modern recommender systems are further improved with deep learning techniques to exploit more complex and nonlinear feature interactions between users and items [Shuai Zhang et al., 2019, *ACM Computing Surveys (CSUR)* (2019), 1-38]. Some representative models include Wide&Deep [Heng-Tze Cheng, et al., 2016, In *DLRS*, 7-10], NCF [Xiangnan He et al., 2017, In *WWW*, 173-182], LRML [Yi Tay, Luu Anh Tuan, and Siu Cheung Hui, 2018, In *WWW*, -739], DeepFM [Huifeng Guo et al., 2017, In *IJCAI*], xDeepFM [Jianxun Lian et al., 2018, In *KDD*, 1754-1763], CDAE [Dawen Liang et al., 2018, In *WWW*, 689-698], etc. Nevertheless, these CF-based models are generally designed to approximate in the first-order (e.g., direct connections between users and items). By forming user-item interactions as a bipartite graph, graph-based models are able to explore the implicit high-order proximity between nodes, which is helpful for discovering deeper connections between users and items in personalized recommender systems [Ming Gao et al., 2018, In *SIGIR*, 715-724; Jheng-Hong Yang et al., 2018, In *RecSys*, 140-144; Lei Zheng et al., 2018, In *RecSys*, 311-319].

B. Graph Convolutional Networks

Graph Convolutional Networks (GCNs), are a special instantiation of convolutional neural networks for structured data. They have received a lot of attention due to their performance in graph embedding [Will Hamilton, Zhitao Ying, and Jure Leskovec, 2017, In *NeurIPS*, 1024-1034; Thomas N. Kipf and Max Welling, 2017, In ICLR; Felix Wu et al., 2019, In *ICML*, 6861-6871]. Some have deployed graph convolutional networks in web-scale recommender systems [Rianne van den Berg, Thomas N Kipf, and Max Welling, 2017, In *KDD Workshop on Deep Learning Day*; Wenqi Fan et al., 2019, In *WWW*, 417-426; Xiangnan He et al., 2020, In *SIGIR*, 639-648; Federico Monti, Michael Bronstein, and Xavier Bresson, 2017, In *NeurIPS*, 3697-3707; HongweiWang et al., 2019, In *WWW*, 3307-3313; Xiang Wang et al., 2019, In *SIGIR*, 165-174; Rex Ying et al., 2018, In *KDD*, 974-983; Lei Zheng et al., 2018, In *RecSys*, 311-319]. For example, GC-MC [Rianne van den Berg, Thomas N Kipf, and Max Welling, 2017, *In KDD Workshop on Deep Learning Day*] and RMGCNN [Federico Monti, Michael Bronstein, and Xavier Bresson, 2017, In *NeurIPS*, 3697-3707] frame recommender systems as matrix completion and design graph convolutional networks on user-item bipartite graphs. SpectralCF [Lei Zheng et al., 2018, In *RecSys*, 311-319] develops a spectral convolution to identify all possible connectivities between users and items in the spectral domain. PinSage [Rex Ying et al., 2018, In *KDD*, 974-983] combines efficient random walks and graph convolutions to generate item embeddings in Pinterest. GraphRec [Wenqi Fan et al., 2019, In *WWW*, 417-426] proposes a heterogeneous graph convolutional network for social recommendations. NGCF [Xiang Wang et al., 2019, In *SIGIR*, 165-174] proposes an embedding propagation layer to harvest the high-order collaborative signals in bipartite graphs. LightGCN [Xiangnan He et al., 2020, In *SIGIR*, 639-648] simplifies the design of graph convolutional networks to be more concise for recommendation purpose.

Although the aforementioned methods have been proven to be effective in generating embeddings of users and items, graph convolutional networks are known to be sensitive to the quality of the input graphs due to their recursive message passing schema [Hanjun Dai et al., 2018, In *ICML*, 1115-1124; Dingyuan Zhu et al., 2019, In *KDD*, 1399-1407]. In other words, slight perturbations on the user-item bipartite graphs can mislead graph convolutional networks to output wrong predictions.

C. Over-Fitting and Over-Smoothing

Two of the main obstacles encountered when developing deeper graph convolutional networks are over-fitting and over-smoothing [Guohao Li et al., 2019, In *CVPR*, 9267-9276; Qimai Li, Zhichao Han, and Xiao-Ming Wu, 2018, In *AAAI*; Dongsheng Luo et al., 2021, In *WSDM*]. Over-fitting comes from an over-parameterized graph convolutional network being used to fit a distribution, given only limited training data. Over-smoothing leads to features of graph nodes gradually converging to the same value when increasing the number of convolutional layers [Qimai Li, Zhichao Han, and Xiao-Ming Wu, 2018, In *AAAI*]. Both of the above two issues can be alleviated by using dropout tricks in the graph convolutional networks. For example, vanilla Dropout [Nitish Srivastava et al., 2014, *The journal of machine learning research* (2014), 1929-1958] randomly masks out the elements in the weight matrix to reduce the effect of over-fitting. However, Dropout does not prevent over-smoothing since it does not make any change of the graph adjacency matrix. DropNode [Will Hamilton, Zhitao Ying, and Jure Leskovec, 2017, In *NeurIPS*, 1024-1034] is a node-oriented method that randomly selects the nodes for mini-batch training. DropEdge [Yu Rong et al., 2019, In *ICLR*] is an edge-oriented method that randomly removes a certain number of edges from the input graphs, acting like a data augmenter. Message Dropout [Xiang Wang et al., 2019, In *SIGIR*, 165-174] randomly drops the outgoing messages in each propagation layers to refine representations. DropoutNet [Maksims Volkovs, Guangwei Yu, and Tomi Poutanen, 2017, In *NeurIPS*, 4957-4966] applies input dropout during training to address cold start issues in recommender systems. Nevertheless, these dropout techniques typically remove a certain fraction of nodes, edges, or features by random, which may lead to sub-optimal performance.

The mechanisms of stochastic binary masks are slightly different from the abovementioned dropout methods, but is more relevant to the recent developments on graph sparsification [Luca Franceschi et al., 2019, In *ICML*, 1972-1982; Cheng Zheng et al., 2020, In *ICML*, 11458-11468]. An optimization algorithm, alternative to random sampling, is used to determine which edges are to be deleted in a data-driven way. As a result, the sparse graphs that best preserve desired properties, e.g., sparse and low-rank, can benefit graph convolutional networks in terms of better robustness and superior generalization.

III. FURTHER DETAILS

In this section, notations are introduced, and the problem setup is defined for recommendation. Then, the proposed structured graph convolutional network model is described in detail. The structured graph convolutional network mainly includes three components: a well-designed graph convolutional network, stochastic binary masks, and rank approximation. Finally, the loss function for model optimization is introduced.

A. Problem Formulation

In this disclosure, a focus is put on learning the user preferences from implicit feedback. To be specific, the behavior data (e.g., for an item marketplace, behavior data may be a click on the item, a review on the item, a purchase of the item, etc.), involves a set of users $\mathcal{U}=\{u\}$ and items $\mathcal{I}=\{i\}$, such that the set $\mathcal{I}_u^+$ represents the items that user u has interacted with before, while $\mathcal{I}_u^-=\mathcal{I}-\mathcal{I}_u^+$ represents unobserved items. Unobserved interactions are not necessarily negative. Rather, it may be that the user may simply be unaware of them.

When viewing user-item interactions formed as a bipartite graph $\mathcal{G}$, it is possible to construct an implicit feedback matrix $R \in \mathbb{R}^{|\mathcal{U}| \times |\mathcal{I}|}$, where $|\mathcal{U}|$ and $|\mathcal{I}|$ denote the total number of users and items, respectively. Each entry $R_{u,i}=1$ if user u has interacted with item i, and $R_{u,i}=0$ otherwise. Its corresponding adjacency matrix A for the bipartite graph can be obtained as:

$$A = \begin{bmatrix} 0 & R \\ R^T & 0 \end{bmatrix}, \quad (1)$$

where the adjacency matrix A can be used as the input graph for the graph convolutional networks later. The aim is to recommend a ranked list of items from $\mathcal{I}_u^-$ that are of interest to the user $u \in \mathcal{U}$, in the same sense, performing link prediction on the bipartite graph $\mathcal{G}$.

B. GCN for Recommendation

1. Over-Fitting and Over-Smoothing

Following the mainstream graph convolutional recommender systems [Xiangnan He et al., 2020, In *SIGIR*, 639-648; Xiangnan He et al., 2017, In *WWW*, 173-182; Xiang Wang et al., 2019, In *SIGIR*, 165-174], the representations of a user u and an item i via embedding lookup tables are described:

$$e_u = \text{lookup}(u), \quad e_i = \text{lookup}(i), \quad (2)$$

where u and i denote the IDs of "user" and "item," respectively; $e_u \in \mathbb{R}^d$ and $e_i \in \mathbb{R}^d$ are the embeddings of user u and item i, respectively, and d is the embedding size. These embeddings are expected to memorize the initial characteristics of items and users. Next, two state-of-the-art GCN-based recommender models are introduced.

2. NGCF

Following the standard graph convolutional network [Thomas N. Kipf and Max Welling, 2017, In *ICLR*], NGCF [Xiang Wang et al., 2019, In *SIGIR*, 165-174] leverages the user-item bipartite graphs to perform embedding propagation and feature transformation as:

$$e_u^{(k+1)} = \sigma\left(W_1 e_u^{(k)} + \sum_{i \in \mathcal{N}_u} \frac{1}{\sqrt{|\mathcal{N}_u||\mathcal{N}_i|}} \left(W_1 e_i^{(k)} + W_2\left(e_i^{(k)} e e_u^{(k)}\right)\right)\right), \quad (3)$$

$$e_i^{(k+1)} = \sigma\left(W_1 e_i^{(k)} + \sum_{u \in \mathcal{N}_i} \frac{1}{\sqrt{|\mathcal{N}_i||\mathcal{N}_i|}} \left(W_1 e_u^{(k)} + W_2\left(e_u^{(k)} e e_i^{(k)}\right)\right)\right),$$

where $e_u^{(k)}$ and $e_i^{(k)}$, with initialization $e_u^{(0)}=e_u$ and $e_i^{(0)}=e_i$ as in equation (2), denote the refined representations of user u and item i in the k-th layer of graph convolutional network, respectively; $\sigma(\cdot)$ is the nonlinear activation function and e denotes the element-wise product; $W_1$ and $W_2$ are trainable weight matrices; $\mathcal{N}_u$ denotes the set of items that are directly interacted by user u, and $\mathcal{N}_i$ denotes the set of users that are connected to item i. As more convolutional layers are added, the model is able to explore high-order collaborative signals between users and items.

3. LightGCN

Several studies have pointed out that simpler, sometimes linear, graph convolutional networks are very effective for representation learnings [Felix Wu et al., 2019, In *ICML*, 6861-6871]. LightGCN [Xiangnan He et al., 2020, In *SIGIR*, 639-648] aims to simplify the design of NGCF to make it more concise for recommendation.

In contrast to NGCF, LightGCN adopts weighted sum aggregators and abandons the use of feature transformation and nonlinear activation. As such, the propagation seen in equation (3) can be simplified as:

$$e_u^{(k+1)} = \sum_{i \in N_u} \frac{1}{\sqrt{|N_u||N_i|}} e_i^{(k)}, \quad (4)$$

$$e_i^{(k+1)} = \sum_{u \in N_i} \frac{1}{\sqrt{|N_i||N_u|}} e_u^{(k)}.$$

The above equation can be re-written in a compact matrix form. Let the 0-th layer embedding matrix be $E^{(0)} \in \mathbb{R}^{(|\mathcal{U}|+|\mathcal{I}|) \times d}$, which collects all of the embeddings of users and items from equation (2). Then, the matrix equivalent form of equation (4) is:

$$E^{(k+1)} = \left(D^{-\frac{1}{2}} A D^{-\frac{1}{2}}\right) E^{(k)}, \quad (5)$$

where $A \in \mathbb{R}^{(|\mathcal{U}|+|\mathcal{I}|) \times (|\mathcal{U}|+|\mathcal{I}|)}$ is the adjacency matrix of the use-item graph as shown in equation (1); D is the corresponding diagonal degree matrix, in which each entry $D_{i,i}$ denotes the number of non-zeros in the i-th row of the matrix A.

4. Model Optimization for NGCF and LightGCN

By propagating K layers, a graph convolutional network obtains K+1 embeddings to represent a user ($e_u^{(0)}, \ldots, e_u^{(K)}$) and an item ($e_i^{(0)}, \ldots, e_i^{(K)}$). An aggregation function may be used to obtain the final representations:

$$e_u^* = AGG(e_u^{(0)}, \ldots, e_u^{(K)}), e_i^* = AGG(e_i^{(0)}, \ldots, e_i^{(K)}),$$

NGCF implements AGG(•) by concatenation while LightGCN uses a weighted sum. An inner product between the two embeddings may used to predict preference score:

$$\hat{y}_{ui} = e_u^{*T} e_i^*.$$

Both methods may employ the Bayesian Personalized Ranking (BPR) loss [Steffen Rendle, In *UAI*, 452-461] to optimize the model parameters, that is minimizing:

$$\mathcal{L}_{BPR}(\Theta) = \sum_{(u,i,j) \in \mathcal{O}} -\ln \sigma(\hat{y}_{ui} - \hat{y}_{uj}) + \alpha \|\Theta\|_2^2, \quad (6)$$

where $\mathcal{O} = \{(u,i,j) | u \in \mathcal{U} \wedge i \in I_u^+ \wedge j \in I_u^-\}$ denotes the pairwise training data; $\sigma(\cdot)$ is the sigmoid function; $\Theta$ denotes model parameters, and $\alpha$ controls the $L_2$ norm to prevent over-fitting.

5. Limitations

Despite of the success of NGCF and LightGCN, they are insufficient to address noise in bipartite graphs. For example, LightGCN fully relies on the adjacency matrix A to refine the representations of users and items in equation (5). The adjacency matrix A, however, may contain noisy edges as discussed in Section I. Those misleading messages continue to propagate as LightGCN goes through more layers. The situations become worse when noisy signals contain low-frequency components. As such, these graph convolutional networks have a high risk of over-fitting to the noise [Hoang N T and Takanori Maehara, 2019, arXiv preprint arXiv: 1905.09550 (2019)].

Vanilla Dropout [Nitish Srivastava et al., 2014, *The journal of machine learning research* (2014), 1929-1958] randomly masks out the elements of weight matrix (e.g., $W_1$ and $W_2$ in equation (3)), which may have a limited ability of preventing noise since it does not make any change to the adjacency matrix A. NGCF attempts to alleviate this issue by removing a fraction of messages or nodes randomly. Nevertheless, doing so weakens the interpretability and understanding of which edges should be kept or deleted in the training stage (see Section IV.C for details). To address this challenge, a simple yet effective data-driven principle, as an alternative to random sampling, to mask out edges by using stochastic binary masks is proposed.

C. Stochastic Binary Masks

1. Graph Sparsification

Figure 3:
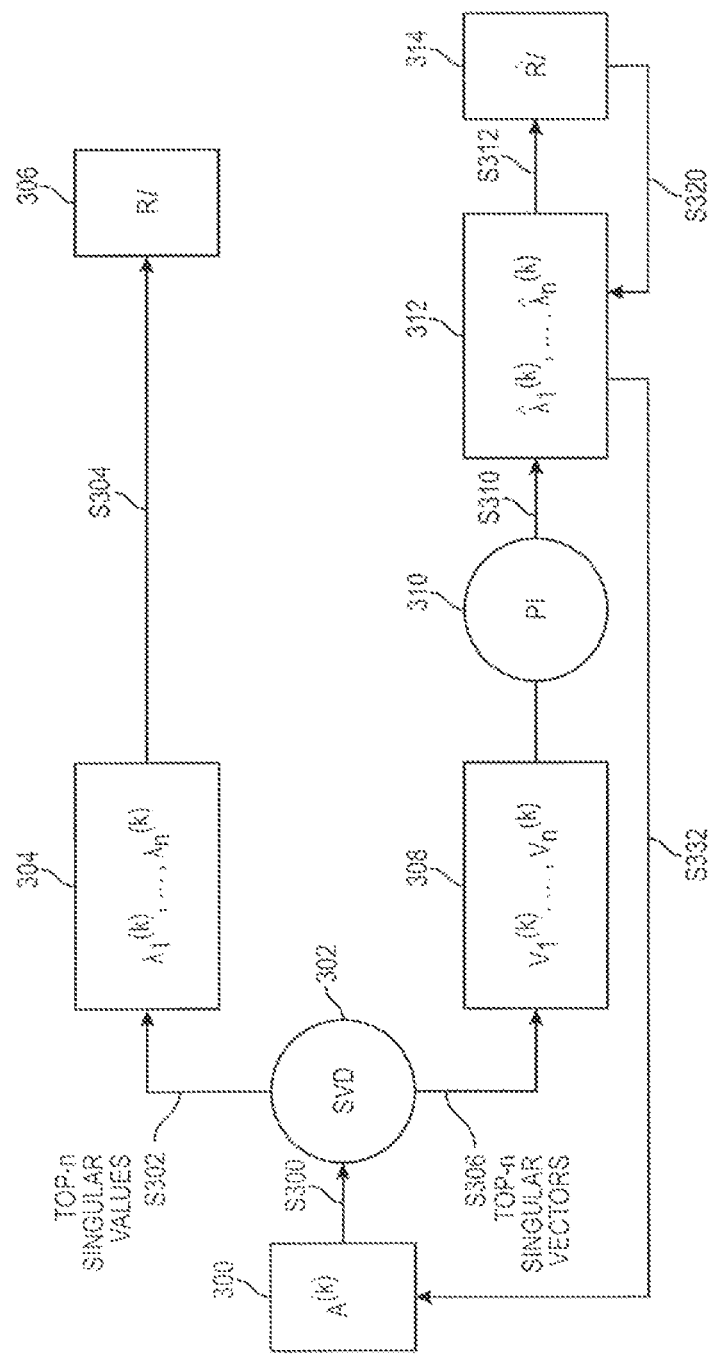
FIG. 3 shows routines used to impose low-rank constraints to a structure graph convolutional network.

To filter out the noise, each layer of the graph convolutional networks is attached with a stochastic binary mask to prune insignificant edges, while simultaneously training the parameters of graph convolutional networks. The overall network architecture is shown in FIG. 3. Formally, for each convolutional layer in equation (5), a binary matrix $Z^{(k)} \in \{0, 1\}$ is introduced, where $Z_{u,v}^{(k)}$ denotes whether the edge between node u and node v is included in the k-th layer. Instead of a fixed adjacency matrix in equation (5), the input graph adjacency matrix for the k-th layer becomes:

$$A^{(k)} = A \odot Z^{(k)}, \quad (7)$$

where $\odot$ denotes the element-wise product. Intuitively, the stochastic binary masks $Z^{(k)}$ (i.e., 1 is sampled and 0 is dropped) can be regarded as graph generators so as to support a high-quality sparse graph for each layer of graph convolutional networks. These sparse graphs enable a subset of neighbor aggregation instead of full aggregation during training, thus avoiding over-smoothing graph convolutional networks when there are many layers. This idea of graph sparsification is known, and its original goal is removing unnecessary edges for graph compressing while keeping almost all information of the input graph [David Eppstein et al., 1997, *Journal of the ACM (JACM)* (1997), 669-696]. This has been recently revisited in deep graph models [Luca Franceschi et al., 2019, In *ICML*, 1972-1982; Cheng Zheng et al., 2020, In *ICML*, 11458-11468].

To encourage sparsity of the adjacency matrix $A^{(k)}$, an $L_0$ regularizer is used to explicitly penalize the number of non-zero entries of $Z^{(k)}$ by minimizing the following equation:

$$\mathcal{R}_s = \sum_{k=1}^{K} \|z^{(k)}\|_0 = \sum_{k=1}^{K} \sum_{(u,v) \in \mathcal{G}} \mathbb{1}[Z_{u,v}^{(k)} \neq 0], \quad (8)$$

where $\|\cdot\|_0$ denotes the $L_0$ norm that can drive insignificant edges to be exact zero. $\mathbb{1}[c]$ is an indicator function that is equal to 1 if the condition c holds, 0 otherwise. Optimization under this penalty, however, is computationally intractable due to the non-differentiability, discrete, and combinatorial nature of the $2^{|\mathcal{G}|}$ possible states of the binary mask $Z^{(k)}$. To address this challenge, a reparameterization is required on these discrete variables as deterministic transformations of the underlying continuous variables, and then apply antithetic sampling to produce low-variance and unbiased gradients. Next, an efficient algorithm is introduced to better backpropagate the gradients of the reparametrization through the stochastic binary layers.

2. Reparameterization and Gradients

The binary masks $Z^{(k)}$ are jointly optimized with the original graph convolutional networks (e.g., NGCF or LightGCN), and then equation (6) and equation (8) are combined as one unified objective:

$$\mathcal{L}(Z, \Theta) = L_{BPR}(\{A \odot Z^{(k)}\}_{k=1}^{K}, \Theta) + \beta \sum_{k=1}^{K} \sum_{(u,v) \in \mathcal{G}} \mathbb{1}[Z_{u,v}^{(k)} \neq 0], \quad (9)$$

where $\beta$ controls the sparsity of graphs. As such, equation (9) involves stochastic gradient estimations, which require marginalization of $2^{|\mathcal{G}|}$ binary sequences. For this reason, each $Z_{u,v}^{(k)}$, is subject to a Bernoulli distribution with parameter $\Pi_{u,v}^{(k)} \in [0,1]$ such that $Z_{u,v}^{(k)} \sim \text{Bern}(\Pi_{u,v}^{(k)})$. Equation (9) can be reformulated as $$\hat{\mathcal{L}}(Z, \Theta) = \mathbb{E}_{Z \sim \prod_{k=1}^{K} Bern(Z^{(k)}; \Pi^{(k)})}[\mathcal{L}_{BPR}(Z, \Theta)] + \beta \sum_{k=1}^{K} \sum_{(u,v) \in \mathcal{G}} \Pi_{u,v}^{(k)}, \quad (10)$$

where $\mathbb{E}$ is the expectation, and the objective $\hat{\mathcal{L}}$ in equation (10) is a variational upper bound[1] for objective $\mathcal{L}$ in equation (9) over the parameters $\Pi^{(k)}$. Now the second term in equation (1) is differentiable with respect to the new parameters $\Pi^{(k)}$. However, the first term is still problematic due to the discrete nature of $Z^{(k)}$.

[1] This can be derived by the Jensen's Inequality.

To efficiently compute gradients, the reparameterization trick shown in [Eric Jang, Shixiang Gu, and Ben Poole, 2017, In *ICLR*], which reparameterizes $\Pi_{u,v}^{(k)} \in [0,1]$ to a deterministic function $g(\bullet)$ of the parameters $\Phi_{u,v}^{(k)}$ is used.

$$\Pi_{u,v}^{(k)} = g(\Phi_{u,v}^{(k)}),$$

Because the deterministic function $g( )$ should be bounded within [0,1], the standard sigmoid function is a good candidate (e.g., $g(x)=1/(1+e^{-x})$). In addition, augment-REINFORCE-merge (ARM), a recently proposed unbiased gradient estimator is adapted to solve the stochastic binary optimization problem [Mingzhang Yin and Mingyuan Zhou, 2019, In *ICLR*].

The following key Theorem can be introduced: For a vector of N binary random variables $z=(z_1, \ldots, z_N)^T$, and any function $f$, the gradient of $$\varepsilon(\phi) = \mathbb{E}_{z \sim \prod_{i=1}^{N} Bern(z_i; \sigma(\phi_i))}[f(z)]$$

with respect to $\phi = (\phi_1, \ldots, \phi_N)^T$, the logits of the Bernoulli probability parameters, can be expressed as:

$$\nabla_\phi \varepsilon(\phi) = \mathbb{E}_{u \sim \prod_{i=1}^{N} Uniform(u_i; 0, 1)}\left[(f(\mathbb{1}[u > \sigma(-\phi)]) - f(\mathbb{1}[u < \sigma(\phi)]))\left(u - \frac{1}{2}\right)\right],$$

where $\mathbb{1}[u>\sigma(-\phi)] := (\mathbb{1}[u_1>\sigma(-\phi_1)], \ldots, \mathbb{1}[u_N>\sigma(-\phi_N)])^T$, and $\sigma(\bullet)$ is the sigmoid function.

Due to the linearity of expectations, ARM is able to directly optimize the Bernoulli variables without introducing any bias, which yields a highly competitive estimator. Moreover, the expectation can be estimated using only an antithetically coupled pair of samples, allowing the gradient to be computed efficiently.

According to above Theorem, let $f$ be the BPR loss function: $f(Z) = \mathcal{L}_{BPR}(Z, \Theta)$, and the reparameterization[2]: $\Pi = \sigma(\Phi)$, one is now able to compute the gradient of $\hat{\mathcal{L}}$ in equation (10) with respect to $\Phi$ in the following matrix form:

[2] Here we denote $Z := \{Z^{(1)}, \ldots, Z^{(K)}\}$, $\Pi := \{\Pi^{(1)}, \ldots, \Pi^{(K)}\}$, and $\Phi := \{\Phi^{(1)}, \ldots, \Phi^{(K)}\}$ for K layers of GCNs.

$$\nabla_\Phi \hat{\mathcal{L}}(\Phi, \Theta) = \mathbb{E}_{U \sim \prod_{k=1}^{K} Uniform(U^{(k)}; 0, 1)}\Bigg[ \quad (11)$$
$$(f(\mathbb{1}[U > \sigma(-\Phi)]) - f(\mathbb{1}[U < \sigma(\Phi)]))\left(U - \frac{1}{2}\right)\Bigg] + \beta \nabla_\Phi \sigma(\Phi),$$

where $f(\mathbb{1}[U>\sigma(-\Phi)])$ is the BPR loss obtained by setting the binary masks $Z^{(k)}$ to 1 if $U^{(k)}>\sigma(-\Phi^{(k)})$ in the forward pass of graph convolutional networks, 0 otherwise. The same strategy may then be applied to $f(\mathbb{1}[U<\sigma(\Phi)])$.

To this end, it is possible to efficiently backpropagate the gradients through stochastic binary masks due to the following three reasons: 1) Sampling from a Bernoulli distribution is replaced by sampling from a uniform distribution between 0 and 1; 2); The first term of equation (11) only involves the forward pass of graph convolutional networks to compute the gradients; 3) The second term $\nabla_\Phi \sigma(\Phi)$ is differentiable and easy to compute. These properties allow the computation of the gradients, which would normally be from a discrete space, to be done in a continuous space.

In the inference stage, the expectation of $Z_{u,v}^{(k)} \sim \text{Bern}(\Pi_{u,v}^{(k)})$ may be used as the mask in equation (7), i.e., $\mathbb{E}(Z_{u,v}^{(k)}) = \Pi_{u,v}^{(k)} = g(\Phi_{u,v}^{(k)})$. Nevertheless, this will not yield a sparse graph from the adjacency matrix $A^{(k)}$ as the sigmoid function in the ARM theorem is smooth and none of the element of masks are exactly equal to zero (unless the hard sigmoid function is used). Here, simply clipping the values $g(\Phi_{u,v}^{(k)}) \leq 0.5$ to zero may guarantee a sparse graph and eliminate any corresponding noisy edges.

It is worth mentioning that several studies have been proposed to estimate the gradients for discrete variables in equations such as equation (10). Some of these studies include REINFORCE [Ronald J Williams, 1992, *Machine learning* 8, 3-4 (1992), 229-256], Gumbel-Softmax [Eric Jang, Shixiang Gu, and Ben Poole, 2017, In *ICLR*], Straight Through Estimator [Yoshua Bengio, Nicholas Léonard, and Aaron Courville, 2013, arXiv preprint arXiv:1308.3432 (2013)], and Hard Concrete Estimator [Christos Louizos, Max Welling, and Diederik P Kingma, 2019, In *ICLR*]. These approaches, however, suffer either from biased gradients or high variance, while the ARM estimator is unbiased, exhibits low variance, and has low computational complexity as shown in [Mingzhang Yin and Mingyuan Zhou, 2019, In *ICLR*].

The ARM estimator for equation (11) is simple, but requires two-forward passes of the graph convolutional networks to compute the BPR loss. In [Mingzhang Yin and Mingyuan Zhou, 2019, In *ICLR*], the authors also introduce its variant, namely Augment-Reinforce (AR), to overcome the issue of double forward pass, however it leads to a higher variance. Fortunately, unlike Convolutional Neural Networks (CNNs), the number of layers in graph convolutional networks is often very small (e.g., the number of layers K≤4 in NGCF and LightGCN) and the complexity of double forward pass is acceptable. Thus, the standard ARM is used in the experiments. Other advanced techniques can be incorporated to further improve the training of stochastic binary masks, such as DisARM [Zhe Dong, Andriy Mnih, and George Tucker, 2020, In *NeurIPS*].

D. Low Rank Approximation

In addition to achieving sparse graphs via binary masks, the graph convolutional networks themselves suffer from vulnerabilities against small perturbations [Hanjun Dai et al., 2018, In *ICML*, 1115-1124]. Changes to one node (e.g., a user or an item) can affect other nodes that are in the same local community. Several studies show that graphs with low-rank constraints are more robust to perturbations [Negin Entezari et al., 2020, In *WSDM*, 169-177; Wei Jin, et al., 2020, In *KDD*, 66-74]. Low-rank constraints are imposed on the adjacency matrix $A^{(k)}$, $0 \leq k \leq K$, by minimizing:

$$\mathcal{R}_l = \sum_{k=1}^{K} \|A^{(k)}\|_* = \sum_{k=1}^{K} \sum_i \lambda_i(A^{(k)}), \quad (12)$$

where $\|\cdot\|_*$ denotes the nuclear norm that is the convex surrogate for rank minimization. $\lambda_i(A^{(k)})$ denotes the i-th largest singular values of the adjacency matrix $A^{(k)}$. Singular value decomposition (Singular Value Decomposition) is often required to optimize the nuclear norm [Negin Entezari et al., 2020, In *WSDM*, 169-177].

Singular Value Decomposition can be easily implemented but is often numerically unstable during backpropagation [Catalin Ionescu, Orestis Vantzos, and Cristian Sminchisescu, 2015, In *CVPR*, 2965-2973; Wei Wang et al., 2019, In *NeurIPS*, 3162-3170]. This is because the partial derivatives of the nuclear norm depend on a matrix K with elements [Catalin Ionescu, Orestis Vantzos, and Cristian Sminchisescu, 2015, In *CVPR*, 2965-2973]:

$$K_{i,j} = \begin{cases} \dfrac{1}{\lambda_i^2 - \lambda_j^2}, & i \neq j \\ 0, & i = j. \end{cases}$$

When two singular values are close, the partial derivatives become very large, causing arithmetic overflow. This is particularly true for large matrices, in which the probability of two singular values being almost equal is much higher than for small ones. The Power Iteration method is one way to solve this problem. Power Iteration relies on an iterative procedure to approximate the dominant eigenvalues and eigenvectors. Nonetheless, Power Iteration is sensitive to how the singular vectors are initialized at the start of each deflation step [Wei Wang et al., 2019, In *NeurIPS*, 3162-3170].

To address these problems, an algorithm that friendly combines Singular Value Decomposition and Power Iteration is explored [Wei Wang et al., 2019, In *NeurIPS*, 3162-3170]. For nuclear norm, the top-n singular values are much more informative, and thus the truncated Singular Value Decomposition may be used to approximate the equation (12) as $$\mathcal{R}_l \approx \sum_{k=1}^{K} \sum_i^n \lambda_i(A^{(k)}).$$

As suggested by [Wei Wang et al., 2019, In *NeurIPS*, 3162-3170], the hybrid strategy is follows: 1) In the forward pass, use the truncated Singular Value Decomposition to compute $[V^{(k)}, \Lambda^{(k)} V^{(k)}]$=Singular Value Decomposition $(A^{(k)})$ for each adjacency matrix and compute the nuclear norm based on $A^{(k)}$; 2) In the backpropagation, compute the gradients from the Power Iteration derivations, but using the Singular Value Decomposition-computed vectors $V^{(k)}$ for initialization purposes. The overall computational graph is demonstrated in FIG. 3.

Figure 4:
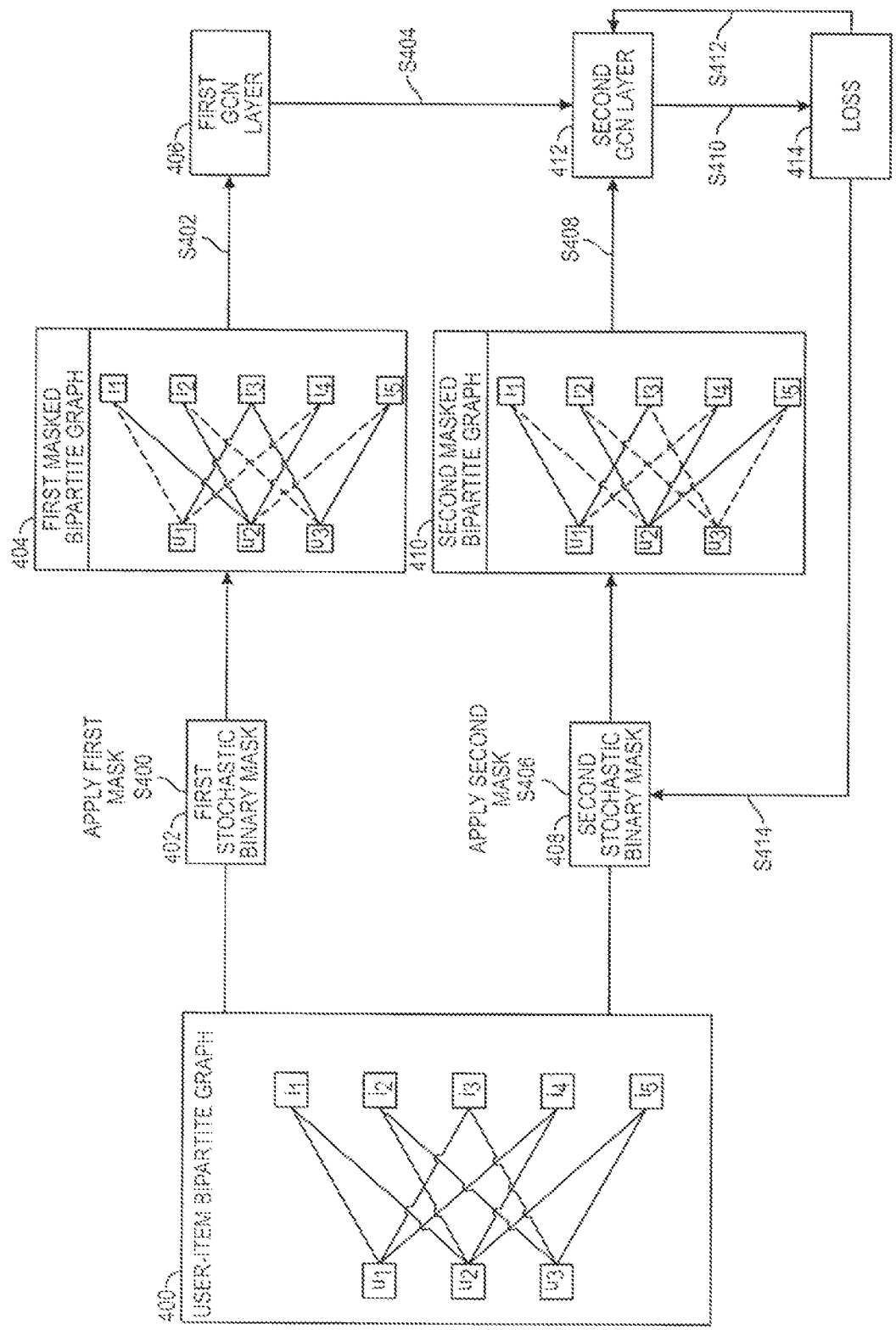
FIG. 4 shows a two-layer graph convolutional network with stochastic binary masks.
Figure 5:
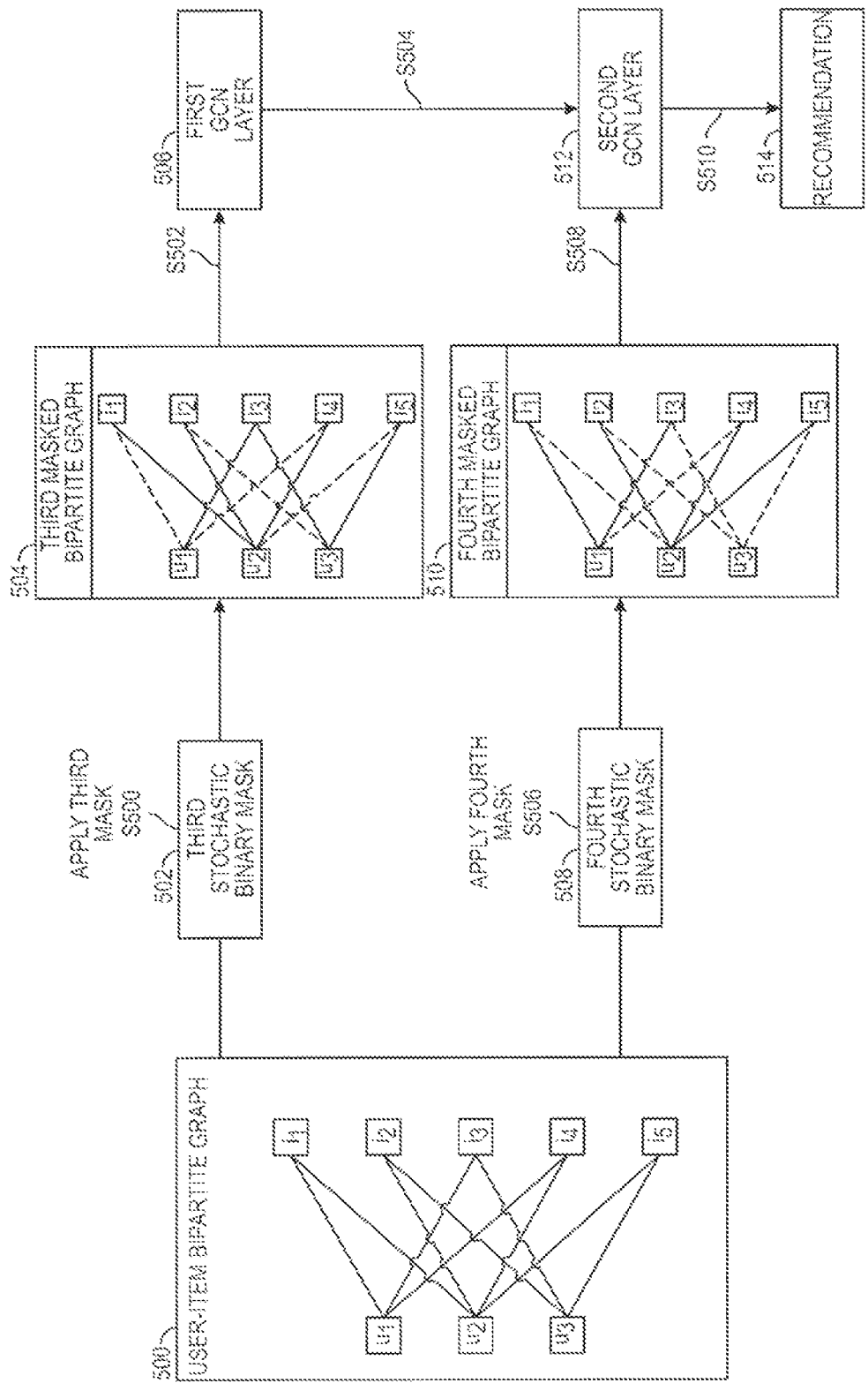
FIG. 5 shows a trained two-layer graph convolutional network with stochastic binary masks used to generate a recommendation score.

FIG. 3 shows routines used to impose low-rank constraints to a structured graph convolutional network. The routines seek to minimize the difference between an input adjacency matrix and an ideal adjacency matrix as determined by equation (12). The routine may begin with an adjacency matrix $A^{(k)}$ 300, which may be the adjacency matrix of the k-th layer of a structured graph convolutional network. As an output, a new adjacency matrix such as $A^{(k)}$ could be formed. With reference to FIGS. 4-5, $A^{(k)}$ could correspond to first masked bipartite graph 404 while $A^{(k)'}$ could correspond to third masked bipartite graph 504. The algorithm described above, which combines Singular Value Decomposition and Power Iteration, may be used in the method of FIG. 3.

In step S300, a Singular Value Decomposition algorithm 302 may be applied to the adjacency matrix $A^{(k)}$ 300. The Singular Value Decomposition algorithm 302 may factorize the adjacency matrix $A^{(k)}$ 300 to receive a list of singular values and singular vectors corresponding to the adjacency matrix $A^{(k)}$ 300. In some embodiments, the singular values may correspond to then strengths of connection between nodes in a bipartite graph. For example, two nodes that have a direct connection between then may have a higher value than two nodes that have an indirect connection through one or more other nodes. Singular vectors may be vector components of the adjacency matrix decomposition.

In step S302, the top-n singular values 304 may be truncated, only leaving the largest singular values. The top-n singular values 304 may be a list of values $\lambda_1^{(k)}, \ldots, \lambda_n^{(k)}$ which have the most influence in the Singular Value Decomposition.

In step S304, the top-n singular values 304 may be used to approximate equation (12) to loss 306

$$\mathcal{R}_l \approx \sum_{k=1}^{K} \sum_i^n \lambda_i(A^{(k)})$$

to complete a first routine. The approximate loss can be used to initialize the data of the power interaction algorithm (i.e., PI 310 in FIG. 3).

In step S306, the top-n singular vectors 308 may be truncated, only leaving the largest singular vectors. The top-n singular vectors 308 may be a list of vectors $v_1^{(k)}, \ldots, v_n^{(k)}$ which have the most influence in the Singular Value Decomposition algorithm 302.

In step S308, the Power Iteration algorithm 310 may be used to generate approximate top-n singular values 312 $\hat\lambda_1^{(k)}, \ldots, 80\,\hat{}_1^{(k)}$. The approximate top-n singular values 312 are an approximation of the top-n singular values 304, and are used for numerical stability.

In step S310, the approximate top-n singular vectors 312 may be used to approximate equation (12) to approximate loss 314

$$\mathcal{R}_l^{\wedge} \approx \sum_{k=1}^{K} \sum_i^n \lambda_i^{\wedge}(A^{(k)})$$

to complete a second routine.

In step S320, after computing the approximate loss 314, the gradient with respect to $\lambda^{(k)}$ of the approximate loss $$314 \frac{\partial R^{\wedge}}{\partial \lambda^{(k)}}$$

may be computed and backpropagated to update the approximate top-n singular values 312 generated by the Power Iteration algorithm 310. The Power Iteration algorithm 310 may be modified in order to minimize the gradient received.

In step S322, the gradient with respect to $A^{(k)}$ of the approximate top-n singular values $$312 \frac{\partial \lambda^{(k)}}{\partial A^{(k)}}$$

may be computed. Remembering that $A^{(k)}=A \odot Z^{(k)}$, and that $Z^{(k)}$ is the trainable stochastic binary mask, the gradient may be minimized by changing the values of the stochastic binary mask (e.g., changing certain values of the stochastic binary mask to 0 or 1).

In conclusion, Singular Value Decomposition is not involved in backpropagation (e.g., in the lower steps S306-S322 of FIG. 3, known as a second routine), Singular Value Decomposition is only involves the forward pass to compute the nuclear norm loss $\mathcal{R}_l$ for equation (12) and initializes the states of Power Iteration. In contrast, the Power Iteration is not involved in the forward pass (e.g., in the upper steps S302-S304 of FIG. 3, known as a first routine), it is only used to compute the gradients during backpropagation (e.g., the steps of the second routine). The resultant computational graph is both numerically stable and differentiable for imposing low-rank constraints in graph convolutional networks.

E. Joint Training

1. Hybrid Loss

To this end, it is possible to jointly learn the graph structure and the graph convolutional network model for the recommendation task. By combining the loss in equation (6), equation (8), and equation (12), the overall objective function of the structured graph convolutional network is given as:

$$\mathcal{L}_{SGCN} = \mathcal{L}_{BPR} + \beta \cdot \mathcal{R}_s + \gamma \cdot \mathcal{R}_l \quad (13)$$

where $\beta$ and $\gamma$ are the hyper-parameters to control the degree of sparsity and low-rank constraints, respectively. The hyper-parameters may be regularization coefficients. The overall training of the structured graph convolutional network is summarized in Algorithm 1.

---

Algorithm 1: SGCN

Input: The training graph A, the number of GCN layers K, and the regularization coefficients $\alpha$, $\beta$, and $\gamma$.
1 for each mini-batch do
2   | for k ← 1 to R do
3   |  | Generate a subgraph $A^{(k)}$ via the stochastic binary mask
  |  | in Eq. (7);
4   |  | Feed $A^{(k)}$ into the k-th layer of GCN;
5   | end

---

Algorithm 1: SGCN

6   | Compute the loss $\mathcal{L}_{SGCN}$ in Eq. (13);
7   | Update the parameters of GCN and stochastic binary masks;
8 end
Output: A well-trained SGCN to predict $\hat{y}_{ui}$.

---

The complexity of structured graph convolutional networks comes from three components: a basic graph convolutional network (either NGCF or LightGCN), stochastic binary masks, and low-rank constraints. The basic graph convolutional network has the same complexity as NGCF or LightGCN, which is denoted as $\mathcal{O}(T)$. The complexity of the stochastic binary masks is derived from ARM in equation (11), which requires a two-forward pass of the graph convolutional network. As discussed before, the number of layers in graph convolutional networks is often very small. As such, the complexity of ARM is roughly $\mathcal{O}(2T)$, which is much less expensive than the standard gradient backpropagation [Mingzhang Yin and Mingyuan Zhou, 2019, In ICLR]. In addition, the major complexity of low-rank constraints is the Singular Value Decomposition computation. Some breakthroughs have been proposed for k-Singular Value Decomposition, such as the Block Krylov method [Cameron Musco and Christopher Musco, 2015, NeurIPS (2015), 1396-1404] or LazySingular Value Decomposition [Zeyuan Allen-Zhu and Yuanzhi Li, 2016, In NeurIPS, 974-982]. As the adjacency matrix $A^{(k)}$ is naturally sparse, it only requires $\mathcal{O}(nnz(A^{(k)}))$ to compute the top-n singular values and their corresponding singular vectors. Although structured graph convolutional network incorporates the sparse and low-rank information, the computational complexity remains the same order as state-of-the-art graph convolutional networks for recommendations.

FIG. 4 shows a two-layer graph convolutional network with stochastic binary masks. The input to the graph convolutional network may be a first dataset comprising embeddings of two node types such as a first type of node and a second type of node (e.g., one type of node may be a user, a second type of node may be an item such as a good or service, and the first dataset may comprise interactions between users and items). More specifically, the first dataset may comprise a plurality of embeddings of a first type and a plurality of embeddings of a second type. For example, the first dataset may comprise nodes of a first type such as "movies" and an embedding to a movies such as "Star Wars®" may have associated data items such as science fiction, action, production year, actors, etc. The first dataset may also comprise nodes of a second type such as "users" and an embedding associated with a user such as "Joe Smith" might include data items associated with age, sex, income, residence, etc. The first dataset may be transformed into a user-item bipartite graph 400, containing the nodes corresponding to a set of users and items, and edges representing interactions between them. A bipartite graph may have an underlying adjacency matrix to which it can be considered equivalent to. The user-item bipartite graph 400 may thus have an equivalent fixed adjacency matrix representation. Thus, a fixed adjacency matrix may be generated from the first dataset. The graph convolutional network of FIG. 4 shows only two layers, however the method may be applied to an n-layer graph convolutional network. Any suitable type of graph convolutional network, such as NGCF or LightGCN may be used as the graph convolutional network of FIG. 4. The graph convolutional network and stochastic binary masks may be trained by, for example, the server computer 108 of FIG. 1. The server computer may have the capabilities to generate graph convolutional networks and stochastic binary masks.

In step S400, a first stochastic binary mask 402 may be applied to the user-item bipartite graph 400, or to its equivalent fixed adjacency matrix. Initially, the first stochastic binary mask 402 may be generated randomly, or by the minimization of equation (8) or a derivative of the equation (e.g., a reparametrized form of equation (8)). As a result of applying the first stochastic binary mask 402 to the user-item bipartite graph 400, or to its equivalent fixed adjacency matrix, a first masked bipartite graph 404 may be generated. The first masked bipartite graph 404 may be an example of a first subgraph of the fixed adjacency matrix associated with the user-item bipartite graph 400. The first masked bipartite graph 404 comprises the same set of users and items as the inputted user-item bipartite graph 400 and may be a subgraph of the user-item bipartite graph 400. However, some of the edges between users and items are masked according to the first stochastic binary mask 402. For example, the input user-item bipartite graph 400 may be A of equation (7) and the first stochastic binary mask 402 may be $Z^{(1)}$ of the same equation. The output first masked bipartite graph 404 is thus $A^{(1)} = A \odot Z^{(1)}$.

In step S402, the first masked bipartite graph 404 may be processed by a first layer of the graph convolutional network, or the first GCN layer 406. The first GCN layer 406 may process the first masked bipartite graph 404 to generate a first embedding matrix. The first embedding matrix may be generated through the use of equation (5), using the first masked bipartite graph 404 as A. The first embedding matrix contains the states of embeddings of the set of users and items in the first masked bipartite graph 404.

In step S404, after a second GCN layer 412 is ready for processing, the first embedding matrix may be sent to a second layer of the graph convolutional network, second GCN layer 412.

In step S406, a second stochastic binary mask 408 may be applied to the user-item bipartite graph 400. The second stochastic binary mask 408 may be generated similarly to the first, by the minimization of equation (8). The result may be a second masked bipartite graph 410 which may be similar in form to the first masked bipartite graph 404. That is, the same set of users and items are contained in the masked graphs. However, the edges between said users and items may be different due the differences between the first stochastic binary mask 402 and the second stochastic binary mask 408. The second masked bipartite graph 410 may be an example of a second subgraph of the fixed adjacency matrix associated with the user-item bipartite graph 400

In step S408, the second GCN layer 412 may process the first embedding matrix (from step S404) and the second subgraph of the fixed adjacency matrix (e.g., the second masked bipartite graph 410) to obtain a second embedding matrix. The second embedding matrix may be generated similarly to the first via equation (5), using the second masked bipartite graph 410 as A.

In step S410, a loss 414 of the structured graph convolutional network may be computed. The loss 414 may be computed via equation (13), which is reproduced below.

$$\mathcal{L}_{SGCN} = \mathcal{L}_{BPR} + \beta \cdot \mathcal{R}_s + \gamma \cdot \mathcal{R}_l \quad (14)$$

where β and γ are the hyper-parameters to control the degree of sparsity and low-rank constraints, respectively. The loss 414 contains three terms, coming from equations (6), (8), and (12). In the case that there are more layers to the graph convolutional network, the loss 414 would be computed after all layers of the graph convolutional network, and associated stochastic binary masks, have been applied. A plurality of gradients of the loss function (e.g., $\mathcal{L}_{SGCN}$) may be determined steps S412 and S414 (described below). The plurality of gradients of the loss 414 may then be used to modify either the stochastic binary masks, or the layers of the graph convolutional network.

In step S412, the loss 414 may be differentiated with respect to Θ (model parameters) resulting in $$\frac{\partial \mathcal{L}_{SGCN}}{\partial \Theta}.$$

The resulting gradient, $$\frac{\partial \mathcal{L}_{SGCN}}{\partial \Theta},$$

may be backpropagated to the second GCN layer 412. This gradient may be associated with the graph convolutional network. The parameter Θ of the graph convolutional network may then be modified to minimize the loss 414.

In step S414, the loss 414 may be differentiated with respect to Φ resulting in $$\frac{\partial \mathcal{L}_{SGCN}}{\partial \Phi}.$$

The resulting gradient $$\frac{\partial \mathcal{L}_{SGCN}}{\partial \Phi},$$

which may be associated with the first or the second stochastic binary mask, may be backpropagated to the second stochastic binary mask 408 and optionally to the first stochastic binary mask 402. In FIG. 4, the parameters of the second stochastic binary mask 408 may then be modified to minimize the loss. For example, the binary values of the second stochastic binary mask 408 may be updated to remove, or re-add, edges between specific users and items.

Additionally, the regularization coefficients β and γ (seen in section III.E.1) may be modified to control the shape of the subgraphs (e.g., the shapes of the masked bipartite graphs), after the parameters of both the graph convolutional network and the stochastic binary masks are modified with the gradient $$\frac{\partial \mathcal{L}_{SGCN}}{\partial \Phi}.$$

This can be at least one of the gradients that was determined from the loss 414. This process can be repeated any number of times using any number of masks and GCN layers. The resulting structured graph convolutional network would include, for example, at least the stochastic binary masks 402, 408, and also at least the GCN layers 406, 412.

The resulting structured graph convolutional network is trained and may be used to generate a recommendation. A second dataset, which may be the same or different as the first, may be fed into the trained structured graph convolutional network. The result of applying the trained structured graph convolutional network may be a recommendation score between embeddings of the second dataset. For example, the second dataset may be another set of embeddings of users and items, and a resulting recommendation score may be between a single user-item pair in the second dataset.

FIG. 5 shows a trained two-layer graph convolutional network with stochastic binary masks used to generate a recommendation score. The trained two-layer graph convolutional network may generated by modifying the parameters, after computing and minimizing a loss, of the graph convolutional network shown in FIG. 4. A second dataset may be used as input into the trained two-layer graph convolutional network. In some embodiments, the second dataset may be a subset of the first dataset of FIG. 4, or it may be new. The second dataset may be associated with the user-item bi-partite graph 500 in FIG. 5. A second fixed adjacency matrix may be generated from the second dataset associated with the user-item bi-partite graph 500 in FIG. 5.

In some embodiments, the second data set may be transformed into a user-item bipartite graph 500, or an equivalent adjacency matrix. If the adjacency matrix corresponding to the user-item bipartite graph 400 of FIG. 4 is a first fixed adjacency matrix, then the adjacency matrix corresponding to the user-item bipartite graph 500 may be a second fixed adjacency matrix.

Steps S500 through S508 can be performed in a similar manner to steps S400-S408 of FIG. 4. In FIG. 5, the user-item bipartite graph 500 may be used as input and a third stochastic binary mask 502 (which may be a modified first stochastic binary mask 402 of FIG. 4) may be applied to it to generate a third masked bipartite graph 504 (which may be an example of a third subgraph of the second fixed adjacency matrix). Similarly, a fourth stochastic binary mask 508 (which may be a modified second stochastic binary mask 408 of FIG. 4) may be applied to the user-item bipartite graph 500 to generate a fourth masked bipartite graph 510 (which may be an example of a fourth subgraph of the second fixed adjacency matrix). The first GCN layer 506 may be the first GCN layer 406 of FIG. 4 with modified parameters. The first GCN layer 506 can be used to process the third masked bipartite graph 504 (which may be an example of the third subgraph of the second fixed adjacency matrix) to obtain a third embedding matrix associated with the second data set. The second GCN layer 512 can be used to process the fourth masked bipartite graph 510 (which may be an example of a fourth subgraph of the second fixed adjacency matrix) with the third embedding matrix to generate a fourth embedding matrix.

In step S510, a candidate embedding pair (e.g., $u_1$ and $i_4$) from the second data set may be selected. For example, as seen in section III.B.4, by propagating K layers a graph convolutional network obtains K+1 embeddings to represent a user ($e_u^{(0)}, \ldots, e_u^{(K)}$) and an item ($e_i^{(0)}, \ldots, e_i^{(K)}$). An aggregation function may be used to obtain the final representations:

$$e_u^* = AGG(e_u^{(0)}, \ldots, e_u^{(K)}), e_i^* = AGG(e_i^{(0)}, \ldots, e_i^{(K)}),$$

Thus, in embodiments of the invention, a user embedding $e_u^1$ could be present in a third embedding matrix derived from the third masked bipartite graph 504 (which may be an example of the third subgraph of the second fixed adjacency matrix) and the user embedding $e_u^2$ could be present in a fourth embedding matrix derived from the fourth masked bipartite graph 510 (which may be an example of the fourth subgraph of the second fixed adjacency matrix). The user embedding $e_u^1$ and the user embedding $e_u^2$ can be vectors for a particular user's (e.g., ui in FIG. 5) characteristics (e.g., interactions with various items) as produced by the first GCN layer 506 and the second GCN layer 512, respectively. These embeddings or vectors can then be combined to form an aggregate embedding or vector (e.g., $e_u^*$).

Data from the third embedding matrix and the fourth embedding matrix can be used to generate a recommendation 514, which may be a recommendation score. For example, an inner product between the two candidate embeddings may used to as a basis to generate the recommendation score:

$$\hat{y}_{ui} = e_u^{*T} e_i^*.$$

The recommendation score may be a probability that the item would be relevant to the user. Recommendation scores may be generated between any pair of user-item embeddings, and may be generated at the same or at separate times as other recommendation scores. In one example, where the first embedding computer 102 of FIG. 1 operates a service for users to view movies, the recommendation scores may be sent to the first embedding computer 102. In another example, the computer training the structured graph convolutional network may directly use the recommendation scores to recommend items to users. The computer training the structured graph convolutional network may generate recommendation scores for a plurality of user-item pairs and store the recommendation scores in a database. The recommendation scores may be retrieved at a later time and transmitted to an embedding computer, or an external device operated by a user (which was in the analyzed dataset) requesting recommendation scores.

Figure 6:
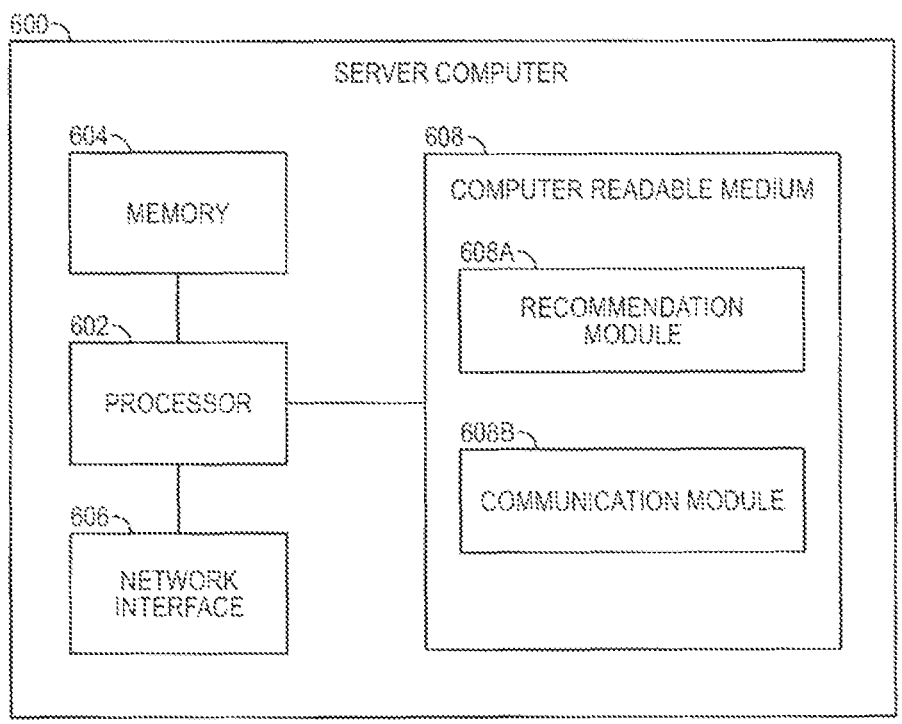

FIG. 6 shows a block diagram of a server computer 600. The server computer 600 may be operated by an entity, such as a marketplace, that generates recommendation scores. The server computer 600 may train a structured graph convolutional network and use the structured graph convolutional network to generate a recommendation score. The server computer 600 may comprise a processor 602. The processor 602 may be coupled to a memory 604, a network interface 606, and a computer readable medium 608. The computer readable medium may comprise any suitable number and types of software modules.

The memory 604 may be used to store data and code. The memory 604 may be coupled to the processor 602 internally or externally (e.g., via cloud based data storage), and may comprise any combination of volatile and/or non-volatile memory such as RAM, DRAM, ROM, flash, or any other suitable memory device. In some embodiments, the memory 604 may store datasets comprising interactions between two types of nodes (e.g., interactions between users and items). The memory 604 may additionally store data, such as a list of recommendation scores between users and items.

The network interface 606 may include an interface that can allow the custodian computer 600 to communicate with external computers and/or devices. The network interface 606 may enable the server computer 600 to communicate data to and from another device such as an embedding computer. Some examples of the network interface 606 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 906 may include Wi-Fi™.

Data transferred via the network interface 906 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 906 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 608 may comprise code, executable by the processor 602, to perform operations which cause the processor 602 to: receive a first dataset comprising a plurality of embeddings of a first type and of a second type, the embeddings of the first type associated with a first node type and the embeddings of the second type associated with a second node type; generate a fixed adjacency matrix from the first dataset; apply a first stochastic binary mask to the fixed adjacency matrix to obtain a first subgraph of the fixed adjacency matrix; process the first subgraph of the adjacency matrix through a first layer of a graph convolutional network to obtain a first embedding matrix; apply a second stochastic binary mask to the fixed adjacency matrix to obtain a second subgraph of the fixed adjacency matrix; process the first embedding matrix and the second subgraph of the fixed adjacency matrix through a second layer of the graph convolutional network to obtain a second embedding matrix; determine a plurality of gradients of a loss function; modify the first stochastic binary mask and the second stochastic binary mask using at least one of the plurality of gradients; generate a second fixed adjacency matrix from a second dataset; apply the modified first stochastic binary mask to the second fixed adjacency matrix to obtain a third subgraph of the second fixed adjacency matrix; process the third subgraph of the second adjacency matrix through the first layer of the graph convolutional network to obtain a third embedding matrix associated with the second dataset; apply the modified second stochastic binary mask to the second fixed adjacency matrix to obtain a fourth subgraph of the second fixed adjacency matrix; process the third embedding matrix associated with the second dataset and the fourth subgraph of the second fixed adjacency matrix through the second layer of the graph convolutional network to obtain a fourth embedding matrix associated with the second dataset; and generate a recommendation score between an embedding of the first type and an embedding of the second type from the second dataset, using at least the third embedding matrix and the fourth embedding matrix associated with the second dataset.

The computer readable medium 608 may comprise a number of software modules including, but not limited to, a recommendation module 608A and a communication module 608B.

The recommendation module 608A may comprise code that causes the processor 602 to generate recommendation scores. For example, the recommendation module 608A may receive as inputs datasets comprising a set of interactions between a plurality of users and items. The recommendation module 608A may transform the dataset into a user-item bipartite graph and/or an adjacency matrix, generate a structured graph convolutional network, train the structured graph convolutional network, and generate a recommendation score. The recommendation module 608A may perform computations based on Singular Value Decomposition, Power Iteration, differentiation, and matrix multiplication.

The communication module 608B in conjunction with the processor 602 can generate, forward, and reformat messages and/or otherwise communicate with other devices. For example, the communication module 608B can enable the server computer 600 to receive datasets from embedding computers. The communication module 608B may additionally enable the server computer 600 to transmit recommendation scores to external devices, such as a computer operated by a user (which may be included in an analyzed dataset) requesting to see recommendation scores, or top-n recommendations.

IV. EXPERIMENTS

In this section, experiments to evaluate the effectiveness and robustness of the proposed structured graph convolutional network are conducted. Specifically, the following questions are answered. RQ1: How effective is the proposed structured graph convolutional network compared to state-of-the-art baselines? RQ2: How can structured graph convolutional network alleviate the problem of noisy edges? RQ3: How do different components (e.g., stochastic binary masks and low-rank constraints) affect the performance of structured graph convolutional network?

TABLE 1

| Dataset statistics. | | | | |
|---|---|---|---|---|
| Dataset | #User | #Items | #Interactions | Sparsity |
| MovieLens | 6,040 | 3,900 | 1,000,209 | 4.190% |
| Gowalla | 29,858 | 40,981 | 1,027,370 | 0.084% |
| Yelp | 31,668 | 38,048 | 1,561,406 | 0.130% |
| Amazon | 52,643 | 91,599 | 2,984,108 | 0.062% |

A. Experimental Settings

1. Datasets

Four public benchmark datasets for evaluating recommendation performance are used. Movielens-1M (https://grouplens.org/datasets/movielens/20m/) is a widely used benchmark for evaluating collaborative filtering algorithms. The dataset contains 1 million user-movie ratings. Gowalla is a check-in dataset obtained from the location-based social website Gowalla, in which users share their locations by checking-in [Dawen Liang et al., 2016, In *WWW*, 951-961]. Yelp (https://www.yelp.com/dataset) is released by the Yelp challenge. It contains various metadata about local businesses (e.g., category, location, opening hours etc.) as well user reviews. The Yelp 2018 version is used in the experiments. Amazon (https://jmcauley.ucsd.edu/data/amazon/) contains a large corpus of user reviews, ratings, and product metadata (e.g., price, brand, and images), collected from Amazon.com. The largest category Books is used, the dataset known for its high sparsity.

For MovieLens, all ratings are treated as implicit feedback (e.g., each rating score is transformed to either 1 or 0 indicating whether a user rates a movie). For sparse datasets: Gowalla, Yelp, and Amazon, the 10-core setting of the graphs is used to ensure that all users and items have at least 10 interactions [Xiangnan He et al., 2020, In *SIGIR*, 639-648; Xiang Wang et al., 2019, In *SIGIR*, 165-174]. A summary of the statistics of the datasets is in Table 1.

For each dataset, a randomly selected 80% of historical interactions of each user is used to construct the training set, and treat the remaining as the test set. From the training set, a random 10% of interactions are selected as a validation set to tune hyper-parameters. For each observed user-item interaction, it is treated as a positive instance, and then ranking triplets are conducted by sampling from negative items the user did not interact with before. Five random splits are performed independently and averaged result is in the experiments.

2. Baselines

The following baselines are used as a comparison to the structured graph convolutional network. BPR-MF [Steffen Rendle, In *UAI*, 452-461]: A classic model that seeks to optimize the Bayesian personalized ranking loss. Matrix factorization is used as its preference predictor. NeuMF [Xiangnan He et al., 2017, In *WWW*, 173-182]: NeuMF learns nonlinear interactions between user and item embeddings via a multi-layer perceptron as well as a generalized matrix factorization component. GC-MC [Rianne van den Berg, Thomas N Kipf, and Max Welling, 2017, *In KDD Workshop on Deep Learning Day*]: GC-MC employs a graph auto-encoder approach to learn the embeddings of users and items. A bilinear decoder is then used to predict the preference scores. HOP-Rec [Jheng-Hong Yang et al., 2018, In *RecSys*, 140-144]: HOP-Rec discovers high-order indirect information of neighborhood items for each user from the bipartite graph by conducting random surfing on the graph. BiNE [Ming Gao et al., 2018, In *SIGIR*, 715-724]: BiNE learns both explicit and implicit user-item relationships by performing biased random walks on the bipartite graph. NGCF [Xiang Wang et al., 2019, In *SIGIR*, 165-174] and LightGCN [Xiangnan He et al., 2020, In *SIGIR*, 639-648]: Two state-of-the-art graph convolutional network-based collaborative filtering models. They are briefly introduced in the Section III.b. S-NGCF: The structured graph convolutional network model is a general framework that is compatible with diverse graph convolutional network models. With NGCF as the basic backbone, the structured NGCF (S-NGCF) aims to improve its performance and robustness. S-LightGCN: Similarly, with the LightGCN as the backbone under the structured graph convolutional network framework.

3. Implementation Details

The structured graph convolutional network models are implemented in TensorFlow. For all models, the embedding dimension d of users and items (e.g., in equation (2)) is searched among $\{16,32,64,128\}$. For baselines BPR-MF, NeuMF, GC-MC, HOP-Rec, and BiNE, their hyper-parameters are initialized as in their original papers and are then carefully tuned to achieve the optimal performance. For the graph convolutional network components inside the proposed structured graph convolutional networks, we use the same hyper-parameters as the original NGCF and LightGCN, such as batch size, stopping criteria, learning rate in Adam optimizer, etc. In addition, the structured graph convolutional network has two hyper-parameters $\beta$ and $\gamma$ to control the degree of sparsity and low-rank structure, respectively. Tuning both $\beta$ and $\gamma$ within $\{0.001,0.005,0.01,0.05, 0.1,0.5\}$ to investigate the parameter sensitivity of our models.

To evaluate the performance of top-n recommendations, two widely used evaluation metrics are used [Xiangnan He et al., 2020, In *SIGIR*, 639-648; Xiang Wang et al., 2019, In *SIGIR*, 165-174]: Recall and Normalized Discounted Cumulative Gain (NDCG) over varying numbers of top ranking items.

TABLE 2

Recommendation performance comparison for different models. Note that R and N are short for Recall and NDCG, respectively. % Improv denotes the relative improvement of SGCNs over their corresponding GCNs. The best results are highlighted in bold and the second best are underlined.

| | MovieLens | | | |
|---|---|---|---|---|
| Metric | R@50 | N@50 | R@100 | N@100 |
| BPR-MF | 0.282 | 0.243 | 0.371 | 0.354 |
| NeuMF | 0.297 | 0.251 | 0.378 | 0.368 |
| GC-MC | 0.291 | 0.247 | 0.375 | 0.360 |
| HOP-Rec | 0.314 | 0.260 | 0.373 | 0.367 |
| BINE | 0.312 | 0.253 | 0.381 | 0.371 |
| NGCF | 0.325 | 0.289 | 0.393 | 0.382 |
| S-NGCF | 0.341 | 0.311 | 0.417 | 0.408 |
| % Improv. | 4.92% | 7.61% | 6.11% | 6.81% |
| LightGCN | 0.328 | 0.294 | 0.399 | 0.384 |
| S-LightGCN | 0.347 | 0.313 | 0.424 | 0.406 |
| % Improv. | 5.79% | 6.46% | 6.27% | 5.73% |

| | Gowalla | | | |
|---|---|---|---|---|
| Metric | R@50 | N@50 | R@100 | N@100 |
| BPR-MF | 0.129 | 0.118 | 0.346 | 0.156 |
| NeuMF | 0.143 | 0.124 | 0.350 | 0.169 |
| GC-MC | 0.137 | 0.122 | 0.347 | 0.163 |
| HOP-Rec | 0.135 | 0.125 | 0.352 | 0.182 |
| BINE | 0.141 | 0.126 | 0.354 | 0.188 |
| NGCF | 0.160 | 0.132 | 0.356 | 0.197 |
| S-NGCF | 0.177 | 0.156 | 0.384 | 0.218 |
| % Improv. | 10.63% | 18.18% | 7.87% | 10.66% |
| LightGCN | 0.163 | 0.134 | 0.360 | 0.205 |
| S-LightGCN | 0.178 | 0.159 | 0.387 | 0.223 |
| % Improv. | 9.20% | 18.66% | 7.50% | 8.78% |

| | Yelp | | | |
|---|---|---|---|---|
| Metric | R@50 | N@50 | R@100 | N@100 |
| BPR-MF | 0.093 | 0.038 | 0.140 | 0.047 |
| NeuMF | 0.103 | 0.040 | 0.151 | 0.050 |
| GC-MC | 0.098 | 0.036 | 0.146 | 0.044 |
| HOP-Rec | 0.111 | 0.048 | 0.163 | 0.053 |
| BINE | 0.110 | 0.042 | 0.155 | 0.049 |
| NGCF | 0.114 | 0.054 | 0.172 | 0.061 |
| S-NGCF | 0.127 | 0.068 | 0.194 | 0.077 |
| % Improv. | 11.40% | 25.93% | 12.79% | 26.23% |
| LightGCN | 0.117 | 0.059 | 0.181 | 0.067 |
| S-LightGCN | 0.134 | 0.073 | 0.199 | 0.081 |
| % Improv. | 14.53% | 23.73% | 9.94% | 20.90% |

| | Amazon | | | |
|---|---|---|---|---|
| Metric | R@50 | N@50 | R@100 | N@100 |
| BPR-MF | 0.069 | 0.041 | 0.122 | 0.059 |
| NeuMF | 0.074 | 0.047 | 0.135 | 0.061 |
| GC-MC | 0.070 | 0.044 | 0.128 | 0.064 |
| HOP-Rec | 0.080 | 0.059 | 0.143 | 0.074 |
| BINE | 0.076 | 0.052 | 0.134 | 0.069 |
| NGCF | 0.092 | 0.065 | 0.157 | 0.076 |
| S-NGCF | 0.107 | 0.074 | 0.170 | 0.087 |
| % Improv. | 16.30% | 13.85% | 8.28% | 14.47% |
| LightGCN | 0.098 | 0.071 | 0.162 | 0.083 |
| S-LightGCN | 0.114 | 0.078 | 0.177 | 0.092 |
| % Improv. | 16.33% | 9.86% | 9.56% | 10.84% |

B. Performance Comparison (RQ1)

In this section, the proposed structured graph convolutional network is compared with the baselines in terms of Recall@n and NDCG@n on all four datasets, where n is set to 50 and 100. The performance for different top-n values is similar in the experiments, so they are omitted. The results for top-n recommendation are summarized in Table 2. The proposed structured graph convolutional network models consistently yield the best performance across all cases. From Table 2, the following observations are made.

Compared with collaborative filtering-based methods (e.g., BPR-MF, NeuMF, and GC-MC), graph-based methods consistently achieve better performance in most cases. This demonstrates the effectiveness of exploiting high-order proximity between users and items in the bipartite graph. As a result, a user is capable of receiving broader messages from items that beyond the user's line of sight.

Among graph-based methods, graph convolutional network-based methods (e.g., NGCF, LightGCN, and SGCNs) perform better than HOP-Rec and BiNE for all the datasets. This is because graph convolutional network-based methods allow end-to-end gradient-based training, and they can directly accept the original graph as input without the need of any preprocessing. In contrast, both HOP-Rec and BiNE first require random walks to generate K-step node sequences and then optimize the node embeddings with the downstream tasks. However, the random walk algorithms can not be trained end-to-end, which may lead to sub-optimal performance.

By comparing the S-NGCF and NGCF, S-NGCF has on average 9.79% improvement with respect to Recall and over 15.47% improvements with respect to NDCG. Analogously, S-LightGCN outperforms the best baseline LightGCN by average 9.85% in Recall and 13.12% in NDCG. From the results, the structured graph convolutional networks perform much better than their vanilla graph convolutional networks. In real-world applications, users are possible to implicitly interact with millions of items, the implicit feedback may be not perfectly matched with user preferences. The original graph convolutional networks are thus incapable of dealing with the noisy interactions (e.g., false positive interactions). On the contrary, structured graph convolutional networks jointly learn a sparse and low-rank graph structure under the architectures of the graph convolutional networks, which have the ability of denoising the users' implicit feedback.

It is common to assume the observations contain some noise, next the resilience to noisy edges is explored, providing some insights on the design of structured graph convolutional networks.

C. Robustness Analysis (RQ2)

1. Noisy Edges Injection

As discussed before, the performance of graph convolutional networks is sensitive to noise as the misleading information can be massively propagated from node to node via noisy edges. In this section, simulated experiments investigate the robustness of structured graph convolutional networks to noisy edges on the graphs. For each dataset, random connections from unobserved edges are created that serve as false positive interactions for each user in the training set. The evaluation is then how different models behave on the simulated graphs with different ratios of noisy edges from 0% to 25%. For better comparison, a focus is put on structured graph convolutional networks and graph convolutional networks, and the results of the other baselines are omitted due to their inferior performance. All the simulated experiments are repeated five times and the average results are shown in FIG. 7.

Figure 7:
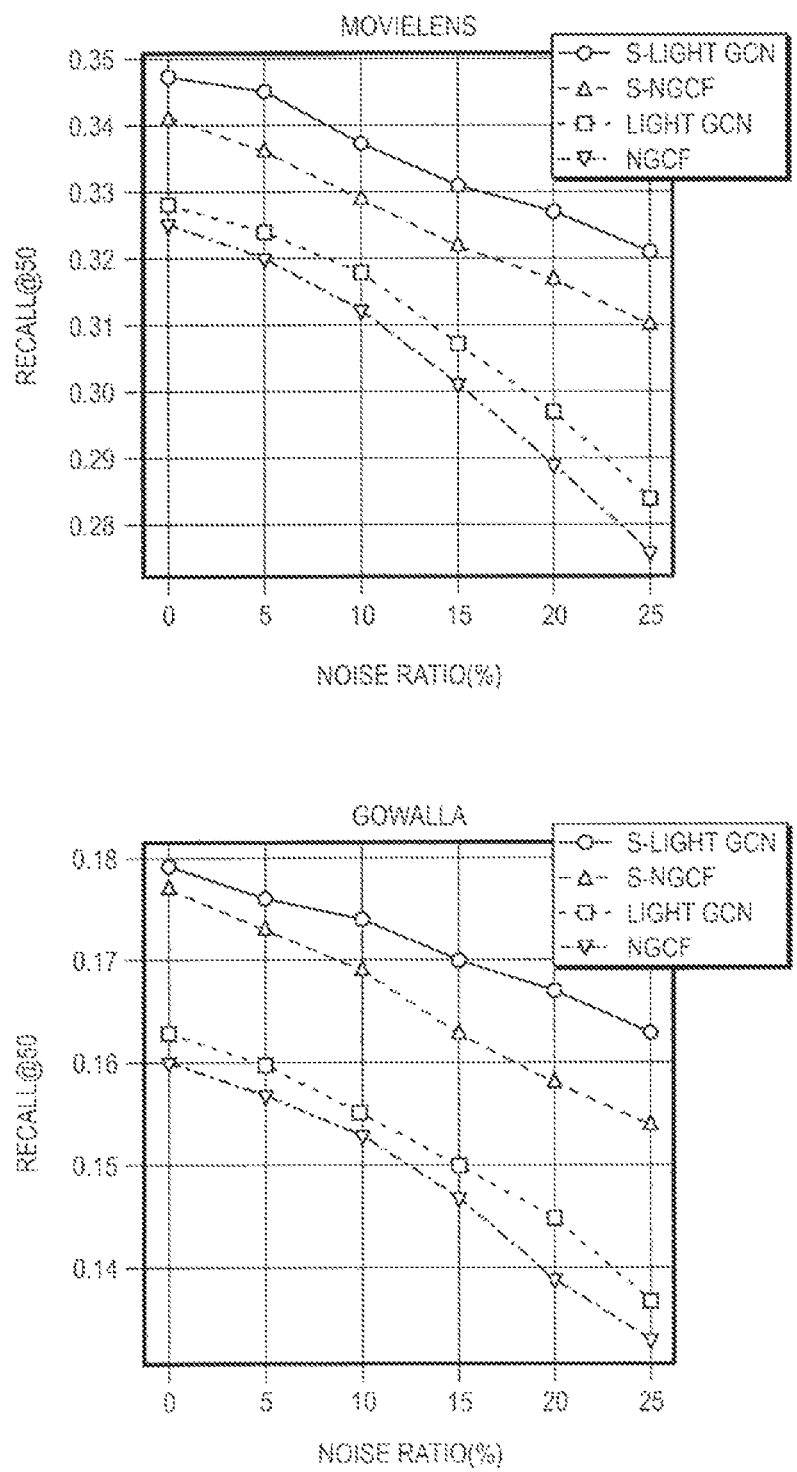
FIG. 7 shows model robustness of structured graph convolutional networks compared to vanilla graph convolutional networks for various levels of noise.
Figure 7:
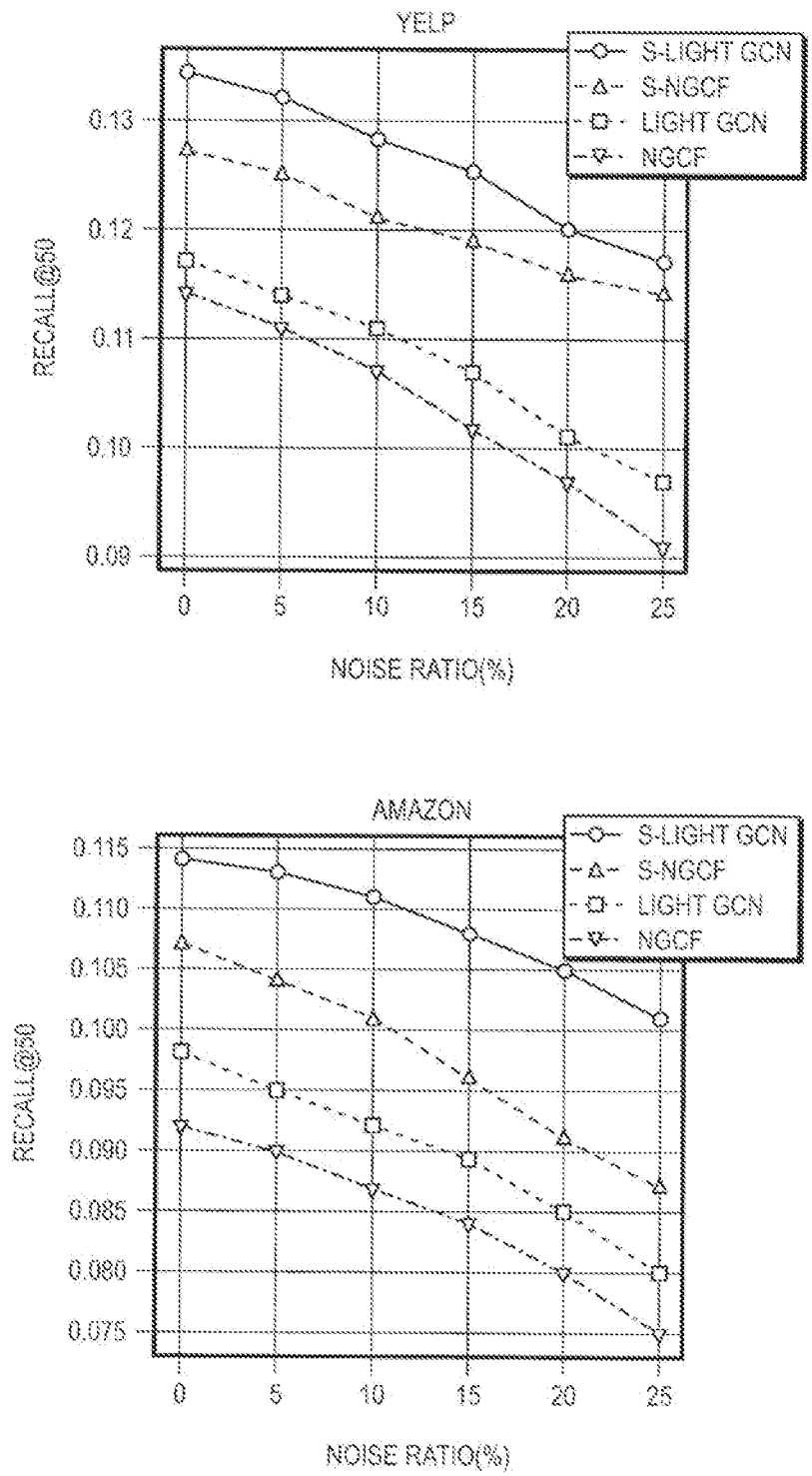

FIG. 7 shows model robustness of structured graph convolutional networks compared to vanilla graph convolutional networks for various levels of noise. From FIG. 7, structured graph convolutional networks consistently outperform graph convolutional networks under different ratios of noise on all datasets. The margins achieved by structured graph convolutional networks over graph convolutional networks become larger as the number of noisy edges increases. For example, S-LightGCN achieves an over 13% improvement over LightGCN in the setting of 25% noise rate on the MovieLens dataset. These comparisons demonstrate that the random messages/nodes sampling strategies used in NGCF/LightGCN are vulnerable to noisy edges.

Figure 8:
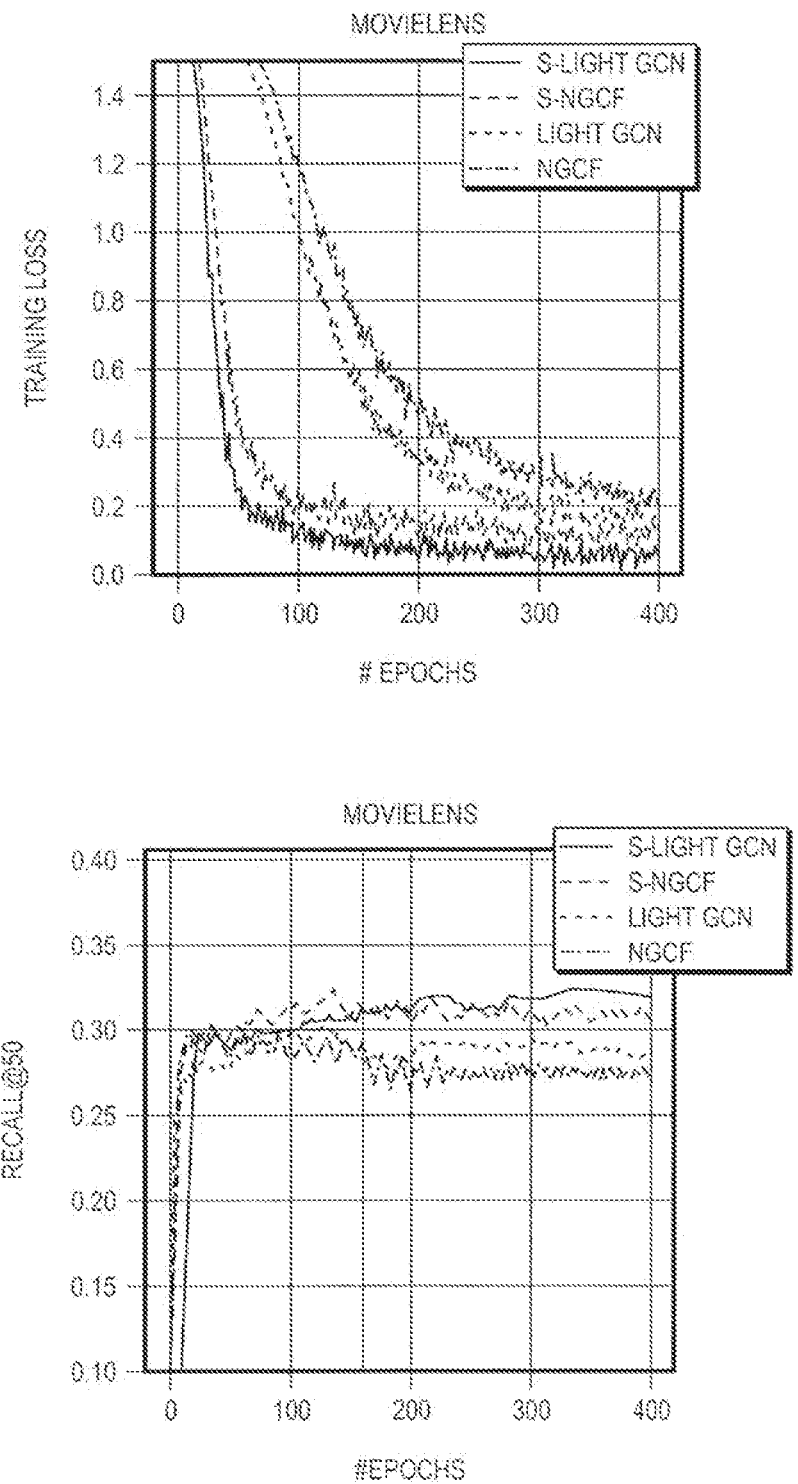
FIG. 8 shows the training curves of training loss and the testing recall for MovieLens dataset with 25% noise.

FIG. 8 shows the training curves of training loss and the testing recall for MovieLens dataset with 25% noise. Clearly, the original graph convolutional networks have a risk of over-fitting to the noise. For example, graph convolutional networks attain stable training errors but produce large uncertainty in the stage of validation. Meaning, the performance of graph convolutional networks slightly decreases with more training epochs. Conversely, structured graph convolutional networks work well for both training and validation.

Structured graph convolutional networks address noise by introducing trainable stochastic binary masks and a low-rank constraint. The stochastic binary masks have the potential to serve as $L_0$ regularization, which drives the insignificant or noisy edges to be exact zero. By sparsifying the graph, it is possible avoid unnecessary computation in the stage of message passing, thus alleviating over-fitting and improving the generalization ability. Meanwhile, the low-rank constraint guarantees that the structure information of graph is well preserved by optimizing its principal singular values. As a result, structured graph convolutional networks can highly reduce the impact of the noisy edges and thus improve the robustness of vanilla graph convolutional networks.

D. Parameter Sensitivity (RQ3)

The following parameter sensitivities of structured graph convolutional networks with respect to the following hyper-parameters: the number of layers K, two regularizer parameters $\{\beta,\gamma\}$ in equation (13), and the number of top-n singular values to approximate nuclear norm in equation (12). The MovieLens dataset is used for hyper-parameter studies, the results for other datasets show the same trend and are omitted.

1. Noisy Edges Injection

The over-smoothing phenomenon exists when training deeper graph convolutional networks [Qimai Li, Zhichao Han, and Xiao-Ming Wu, 2018, In AAAI]. To illustrate its influence, experiments are conducted with varying number of graph convolutional network layers K within [Heng-Tze Cheng, et al., 2016, In DLRS, 7-10; Negin Entezari et al., 2020, In WSDM, 169-177; Xiangnan He et al., 2020, In SIGIR, 639-648; Cameron Musco and Christopher Musco, 2015, NeurIPS (2015), 1396-1404]. The results are presented in FIG. 9.

Figure 9:
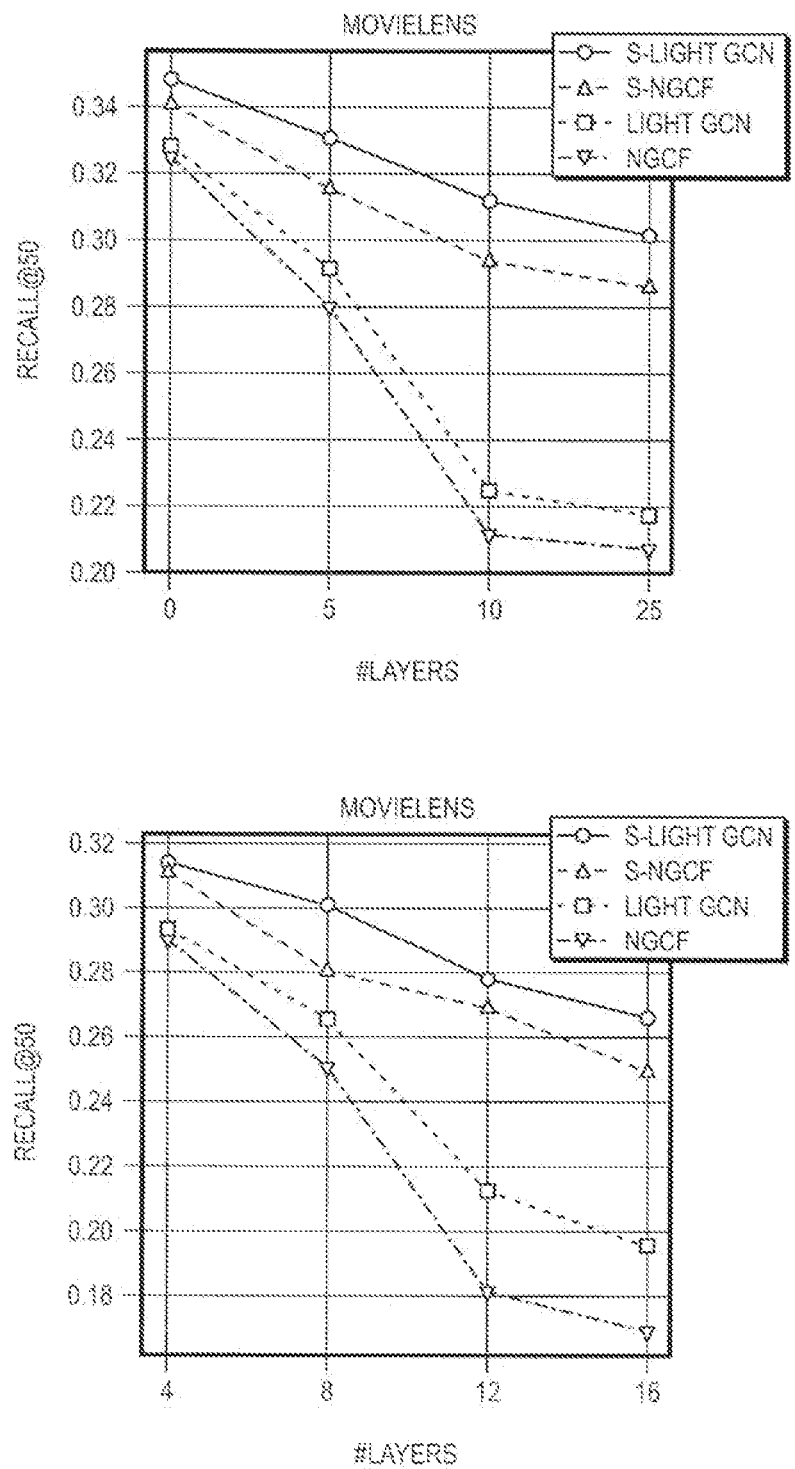
FIG. 9 shows oversmoothing for structured graph convolutional networks and vanilla graph convolutional networks.

FIG. 9 shows oversmoothing for structured graph convolutional networks and vanilla graph convolutional networks. A significant performance drop for both NGCF and LightGCN is observed by increasing the number of layers. The structured graph convolutional networks successfully alleviate the over-smoothing issue. The reason is that the stochastic binary masks enable a subset of neighbor aggregation instead of full aggregation during training. This strategy prevents all node representations converging to the same value as the graph convolutional networks go deeper, which improves the generalization ability in the testing phase. The findings are consistent with the recent work DropEdge [Yu Rong et al., 2019, In ICLR]. In fact, if $\beta=\gamma=0$ and the stochastic masks are allowed to randomly drop certain rate of edges (e.g., simply detach the masks from the computational graph), the structured graph convolutional networks can be then degraded to DropEdge. It is found that non-zero settings of $\beta$ and $\gamma$ in structured graph convolutional networks generally outperform DropEdge. DropEdge, a random dropping method, cannot discern between true or noisy edges, while structured graph convolutional networks can precisely remove the noisy edges with the parameterized masks.

2. Regularizers

Figure 10:
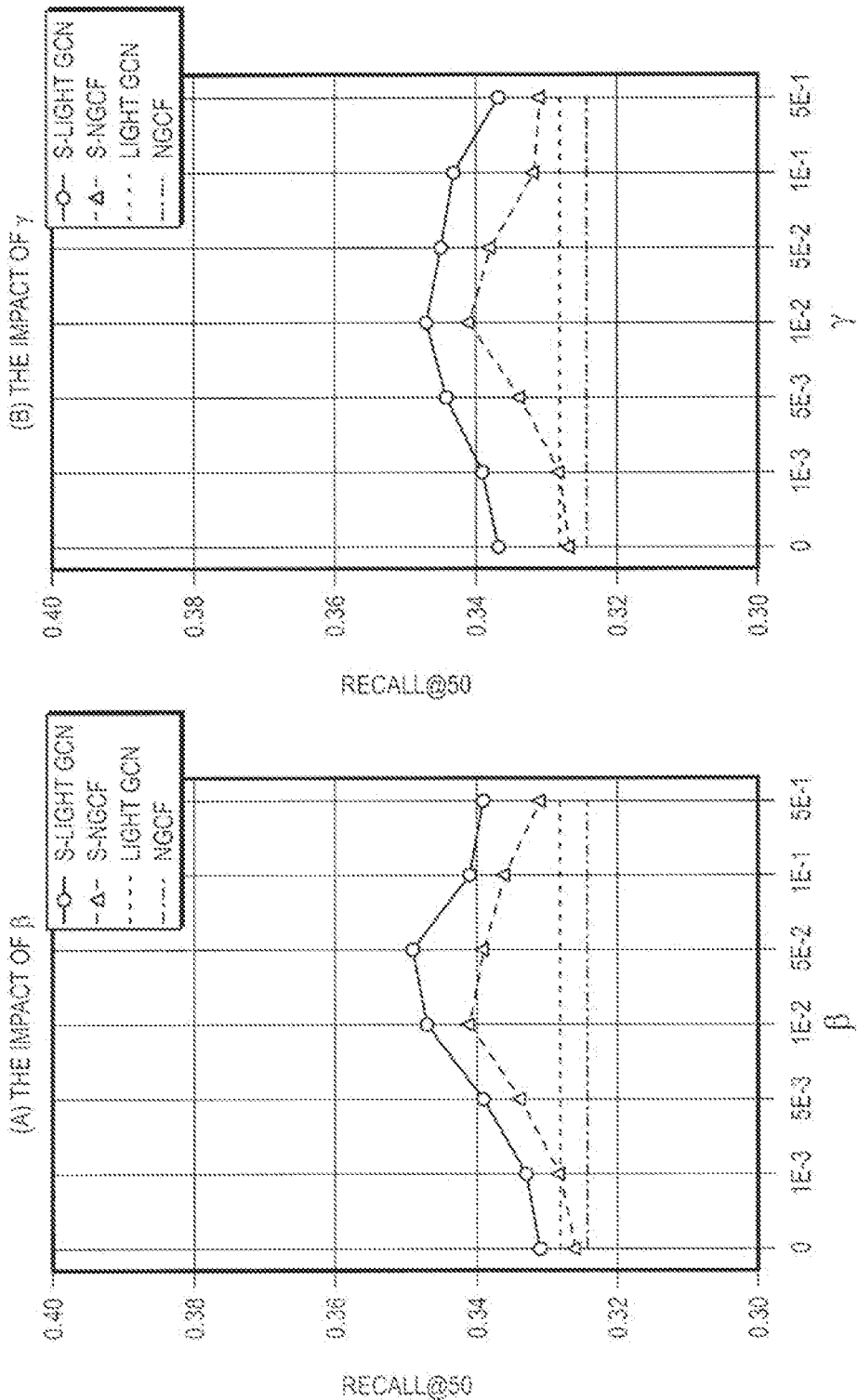
FIG. 10 shows parameter sensitivity for a dataset.
Figure 10:
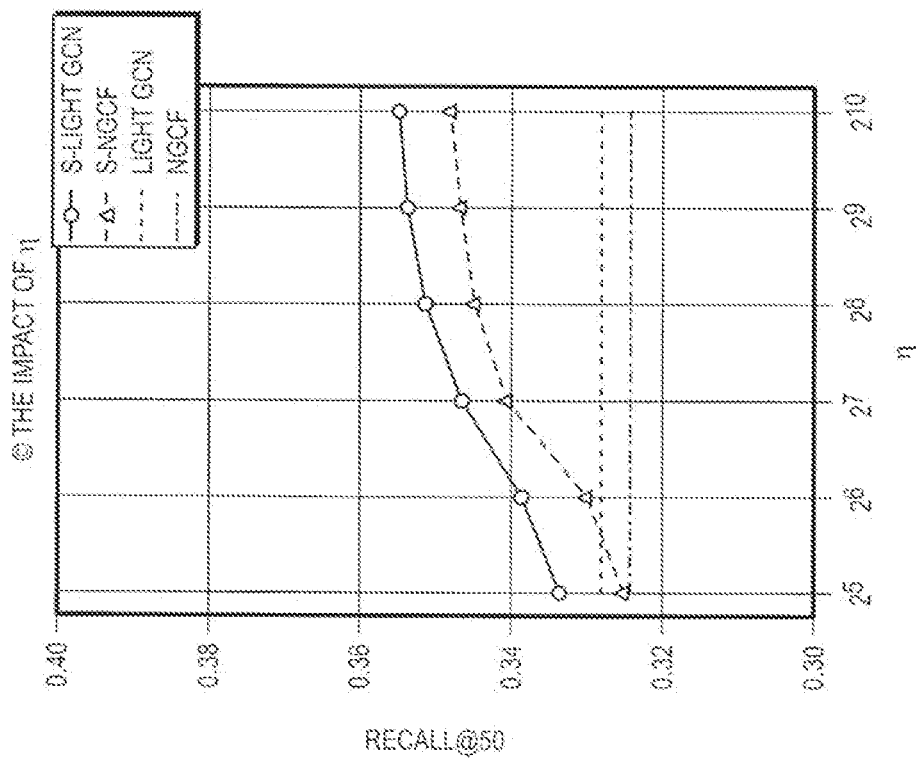

There are two major regularization parameters $\beta$ and $\gamma$ for sparsity $\mathcal{R}_s$ and low-rank constraints $\mathcal{R}_l$. FIG. 10 shows parameter sensitivity for the MovieLens dataset. FIGS. 10(a) and 10(b) show the performance by changing one parameter while fixing the other as 0.01. As can be seen, the non-zero choices of $\beta$ and $\gamma$ demonstrate the importance of the regularization terms in our models. Even in the worst settings of $\beta=0$ or $\gamma=0$, structured graph convolutional networks are still better than the baselines. In the extreme case, i.e., setting $\beta=\gamma=0$ and turning on all masks to be all-ones matrices, the structured graph convolutional networks exactly become graph convolutional networks. FIG. 10(c) also shows the effect of the number of top-n singular values to approximate the nuclear norm. The performance increases with a larger n. Nevertheless, larger n leads to more running time. It is reasonable to set n within $[2^7, 2^8]$ in the experiments.

V. CONCLUSION

A Structured Graph Convolutional Networks is proposed to reduce the negative effects of noise in user-item bipartite graphs. In particular, enforced sparsity and low-rank structures of the input graph while simultaneously training the parameters of graph convolutional networks are used. The proposed structured graph convolutional network is compatible with various graph convolutional network models, such as NGCF and LightGCN, which can improve their robustness and generalization performance. The extensive experiments with real-world datasets show that SGCNs outperform the existing baselines.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving a first dataset comprising a plurality of embeddings of a first type and of a second type, the embeddings of the first type associated with a first node type and the embeddings of the second type associated with a second node type;
   generating a fixed adjacency matrix from the first dataset;
   applying a first stochastic binary mask to the fixed adjacency matrix to obtain a first subgraph of the fixed adjacency matrix;
   processing the first subgraph of the fixed adjacency matrix through a first layer of a graph convolutional network to obtain a first embedding matrix;
   applying a second stochastic binary mask to the fixed adjacency matrix to obtain a second subgraph of the fixed adjacency matrix;
   processing the first embedding matrix and the second subgraph of the fixed adjacency matrix through a second layer of the graph convolutional network to obtain a second embedding matrix;
   determining a plurality of gradients of a loss function;
   modifying the first stochastic binary mask and the second stochastic binary mask using at least one of the plurality of gradients;
   generating a second fixed adjacency matrix from a second dataset;
   applying the modified first stochastic binary mask to the second fixed adjacency matrix to obtain a third subgraph of the second fixed adjacency matrix;
   processing the third subgraph of the second fixed adjacency matrix through the first layer of the graph convolutional network to obtain a third embedding matrix associated with the second dataset;
   applying the modified second stochastic binary mask to the second fixed adjacency matrix to obtain a fourth subgraph of the second fixed adjacency matrix;
   processing the third embedding matrix associated with the second dataset and the fourth subgraph of the second fixed adjacency matrix through the second layer of the graph convolutional network to obtain a fourth embedding matrix associated with the second dataset; and
   generating a recommendation score between an embedding of the first type and an embedding of the second type from the second dataset, using at least the third embedding matrix and the fourth embedding matrix associated with the second dataset.

2. The method of claim 1, wherein the first and second fixed adjacency matrices are derived from first and second bipartite graphs, respectively.

3. The method of claim 1, wherein the second dataset is received from an external computer.

4. The method of claim 1, wherein the second dataset is a subset of the first dataset.

5. The method of claim 1, wherein the first node type is a user and the second node type is an item.

6. The method of claim 1, wherein modifying one or more of the first stochastic binary mask and second stochastic binary mask comprises:
   backpropagating the at least one of the plurality of gradients to the second stochastic binary mask; and
   modifying values of the second stochastic binary mask to minimize the at least one of the plurality of gradients.

7. The method of claim 1, wherein modifying one or more of the first stochastic binary mask and second stochastic binary mask comprises modifying both the first and the second binary stochastic masks.

8. The method of claim 1, further comprising:
backpropagating the at least one of the plurality of gradients to the second layer of the graph convolutional network; and
modifying the second layer of the graph convolutional network using the at least one of the plurality of gradients.

9. The method of claim 1, wherein the graph convolutional network is a collaborative filtering-based graph convolutional network.

10. The method of claim 1, wherein the graph convolutional network is a graph-based graph convolutional network.

11. The method of claim 1, further comprising:
storing the recommendation score in a database; and
transmitting the recommendation score to an external computer.

12. A server computer comprising:
a processor; and
a non-transitory computer readable medium comprising code executable by the processor to cause the processor to:
receive a first dataset comprising a plurality of embeddings of a first type and of a second type, the embeddings of the first type associated with a first node type and the embeddings of the second type associated with a second node type;
generate a fixed adjacency matrix from the first dataset;
apply a first stochastic binary mask to the fixed adjacency matrix to obtain a first subgraph of the fixed adjacency matrix;
process the first subgraph of the fixed adjacency matrix through a first layer of a graph convolutional network to obtain a first embedding matrix;
apply a second stochastic binary mask to the fixed adjacency matrix to obtain a second subgraph of the fixed adjacency matrix;
process the first embedding matrix and the second subgraph of the fixed adjacency matrix through a second layer of the graph convolutional network to obtain a second embedding matrix;
determine a plurality of gradients of a loss function;
modify the first stochastic binary mask and the second stochastic binary mask using at least one of the plurality of gradients;
generate a second fixed adjacency matrix from a second dataset;
apply the modified first stochastic binary mask to the second fixed adjacency matrix to obtain a third subgraph of the second fixed adjacency matrix;
process the third subgraph of the second fixed adjacency matrix through the first layer of the graph convolutional network to obtain a third embedding matrix associated with the second dataset;
apply the modified second stochastic binary mask to the second fixed adjacency matrix to obtain a fourth subgraph of the second fixed adjacency matrix;
process the third embedding matrix associated with the second dataset and the fourth subgraph of the second fixed adjacency matrix through the second layer of the graph convolutional network to obtain a fourth embedding matrix associated with the second dataset; and
generate a recommendation score between an embedding of the first type and an embedding of the second type from the second dataset, using at least the third embedding matrix and the fourth embedding matrix associated with the second dataset.

13. The server computer of claim 12, wherein the first and second fixed adjacency matrices are derived from first and second bipartite graphs, respectively.

14. The server computer of claim 12, wherein the first node type is a user and the second node type is an item.

15. The server computer of claim 12, wherein the code further causes the processor to:
modify regularization coefficients to control shapes of the subgraphs associated with an adjacency matrix.

16. The server computer of claim 12, wherein the code further causes the processor to:
backpropagate the at least one of the plurality of gradients to the second layer of the graph convolutional network; and
modify the second layer of the graph convolutional network using the at least one of the plurality of gradients.

17. The server computer of claim 12, wherein the second dataset is received from an external computer.

18. The server computer of claim 12, wherein the second dataset is a subset of the first dataset.

19. The server computer of claim 12, further comprising a memory that stores the recommendation score.

20. The server computer of claim 19, wherein the code further causes the processor to:
transmit the recommendation score to an external computer.

* * * * *